United States Patent
Ueshima et al.

(10) Patent No.: US 7,963,851 B2
(45) Date of Patent: Jun. 21, 2011

(54) ENTERTAINMENT DEVICE USING CARDS

(75) Inventors: Hiromu Ueshima, Shiga (JP); Shuhei Kato, Shiga (JP); Mark Kanghyeon Kim, Walnut Creek, CA (US)

(73) Assignee: SSD Company Limited, Kusatsu-Shi, Shiga (JP)

(*) Notice: Subject to any disclaimer, the term of this patent is extended or adjusted under 35 U.S.C. 154(b) by 636 days.

(21) Appl. No.: 10/542,571

(22) PCT Filed: Jan. 20, 2004

(86) PCT No.: PCT/JP2004/000441
§ 371 (c)(1),
(2), (4) Date: Jul. 19, 2005

(87) PCT Pub. No.: WO2004/066214
PCT Pub. Date: Aug. 5, 2004

(65) Prior Publication Data
US 2006/0068860 A1    Mar. 30, 2006

(30) Foreign Application Priority Data

Jan. 20, 2003 (JP) ................................. 2003-011644

(51) Int. Cl.
  *A63F 9/24* (2006.01)
  *A63F 13/00* (2006.01)
  *G06F 17/00* (2006.01)
  *G06F 19/00* (2006.01)
(52) U.S. Cl. ............... 463/47; 463/11; 463/12; 463/44; 463/43; 382/165; 382/166; 382/191; 395/615; 395/613

(58) Field of Classification Search .............. 463/44–47; 382/103, 219, 220, 221
See application file for complete search history.

(56) References Cited

U.S. PATENT DOCUMENTS

| | | | | |
|---|---|---|---|---|
| 4,760,247 A | * | 7/1988 | Keane et al. | 235/454 |
| 4,861,031 A | * | 8/1989 | Simms | 273/295 |
| 5,644,765 A | * | 7/1997 | Shimura et al. | 707/104.1 |
| 6,047,085 A | * | 4/2000 | Sato et al. | 382/165 |
| 6,937,774 B1 | * | 8/2005 | Specht et al. | 382/254 |
| 6,973,218 B2 | * | 12/2005 | Alderson et al. | 382/260 |

(Continued)

FOREIGN PATENT DOCUMENTS

JP      04-088490 A    3/1992

(Continued)

OTHER PUBLICATIONS

Sato, Kotaro et al., Image Recognition Technologies and its Applications for Amusement, ITE Technical Report, vol. 26, No. 54, Jul. 2002, pp. 25-28.

*Primary Examiner* — Paul A. D'Agostino
(74) *Attorney, Agent, or Firm* — Jackson Patent Law Office

(57) ABSTRACT

A card game apparatus 12 includes an image sensor 54. The image sensor photographs a design (31: FIG. 2) printed on a card 30. A photographic signal from the image sensor is sampled by a game processor 64, and is further re-sampled to form a photographic pixel data array. A ROM 66 is provided with a database (67A: FIG. 7) which is assigned a comparison data array and a card ID for each entry. By searching the database based on the photographic pixel data array, the processor 64 obtains one card ID and displays card data of the card identified by the card ID on a television monitor.

24 Claims, 28 Drawing Sheets

U.S. PATENT DOCUMENTS

| | | | |
|---|---|---|---|
| 7,006,693 B2 * | 2/2006 | Shibuya | 382/191 |
| 7,116,824 B2 * | 10/2006 | Plaza | 382/209 |
| 2002/0028710 A1 * | 3/2002 | Ishihara et al. | 463/44 |
| 2002/0076120 A1 * | 6/2002 | Loce et al. | 382/300 |
| 2003/0113038 A1 * | 6/2003 | Spencer et al. | 382/305 |
| 2003/0171142 A1 * | 9/2003 | Kaji et al. | 463/11 |

FOREIGN PATENT DOCUMENTS

| | | | |
|---|---|---|---|
| JP | 07-244716 A | | 9/1995 |
| JP | 2001-334012 | | 12/2001 |
| JP | 2001334012 A | * | 12/2001 |
| JP | 2002-102529 A | | 4/2002 |
| JP | 2002102529 A | * | 4/2002 |
| JP | 2002-136766 A | | 5/2002 |
| JP | 2002-224443 A | | 8/2002 |
| JP | 2002-301264 A | | 10/2002 |
| WO | 02/062440 A1 | | 8/2002 |

* cited by examiner

| | [0] | [1] | [2] | • | • | • | [63] | |
|---|---|---|---|---|---|---|---|---|
| ENTRY #0 | 06 | 27 | A8 | • | • | • | 6D | CARD DATA |
| ENTRY #1 | 00 | 36 | 98 | • | • | • | 43 | CARD DATA |
| ENTRY #2 | 25 | 66 | 74 | • | • | • | AC | CARD DATA |
| ⋮ | ⋮ | ⋮ | ⋮ | | | | ⋮ | |
| ENTRY #127 | B8 | F1 | 58 | • | • | • | 36 | CARD DATA |

| | IDENTIFIED CARD ID | ID[0] | ID[1] | ID[2] | ID[3] | • | • | • |
|---|---|---|---|---|---|---|---|---|
| ENTRY #0 | #1 | #1 | #12 | #18 | | | | |
| ENTRY #1 | #3 | #3 | #1 | #110 | #65 | | | |
| ENTRY #2 | #4 | #22 | #4 | | | | | |
| ⋮ | ⋮ | ⋮ | | | | | | |
| ENTRY #85 | #122 | #122 | #127 | | | | | |

(a) REGISTER SETTING CLOCK (b) REGISTER DATA

US 7,963,851 B2

ENTERTAINMENT DEVICE USING CARDS

CROSS-REFERENCE TO RELATED APPLICATION

This application is a National Stage entry of International Application No. PCT/JP2004/000441 filed Jan. 20, 2003, the entire specification claims and drawings of which are incorporated herewith by reference.

TECHNICAL FIELD

The present invention relates to an entertainment apparatus using cards. More specifically, the present invention relates to an entertainment apparatus using cards, which photographs a design printed on a card, identifies the card by searching a card identification database based on a photographed image, and utilizes an identification result as input for a game, etc.

PRIOR ART

Conventionally, various card game systems have been proposed in patent document 1 (Japanese Patent Application Laying-open No. 2001-334012), patent document 2 (Japanese Patent Application Laying-open No. 2002-136766), patent document 3 (Japanese Patent Application Laying-open No. 2002-301264) and patent document 4 (Japanese Patent Application Laying-open No. 2002-224443), for example.

Patent document 1 discloses a card reading cartridge for a portable game machine and a card on which an identification code is printed. Patent document 2 discloses the determination of authenticity of a read card by a card reading apparatus and a connected game machine by accessing a website on the Internet. Patent document 3 discloses a large-sized arcade game machine for a multitude of people on which, for example, a soccer game is played by use of cards on each of which a soccer player is printed. In addition, patent document 4 proposes a card game system that uses cards with printed patterns invisible to the naked eye, such as barcodes printed in ultraviolet ink.

As shown in the prior arts, in order to identify a paper card, etc. that has no special mechanism for card identification, such as IC card and magnetic card, it is necessary to print an identification code such as one-dimensional/two-dimensional barcode. In other words, the card reading apparatuses according to the above mentioned prior arts cannot identify a card on which no identifiable dedicated code is recorded in advance. Accordingly, in playing a card game where a result of card identification is taken as input, for example, a dedicated card reading apparatus and card are required.

SUMMARY OF THE INVENTION

It is therefore a primary object of the present invention to provide a novel entertainment apparatus using cards.

It is another object of the present invention to provide an entertainment apparatus using cards that can identify even a card with no identification code and obtain input based on an identification result.

The present invention of claim 1 is an entertainment apparatus for obtaining inputs from a plurality of cards on each of which a visually human-identifiable design is printed and performing information processing in accordance with the inputs. The entertainment apparatus using cards comprises a photographing means for photographing the design of the card and fetching a photographic pixel data array; a database including a plurality of entries individually corresponding to the plurality of cards, each of the entries including a pair of a card ID and a comparison data array; a card identification means for searching the database for a specific comparison data array based on the above mentioned photographic pixel data array and obtaining a card ID pairing up with the specific comparison data array; and an information processing means for performing the information processing with the card ID obtained by the card identification means as an input.

The present invention of claim 2 is an entertainment apparatus according to claim 1. The photographing means includes an image sensor for photographing a design and outputting a photographic signal, a data array forming means for sampling the photographic signal at a first resolution and forming a data array, and a photographic pixel data array forming means for re-sampling the data array at a second resolution which is lower than the first resolution and forming the photographic pixel data array. The comparison data array includes comparison data corresponding to the second resolution.

The present invention of claim 3 is an entertainment apparatus according to claim 2. The card identification means calculates a distance between the photographic pixel data array and the comparison data array, and obtains the card ID of the entry with the comparison data array at the shortest distance.

The present invention of claim 4 is an entertainment apparatus according to claim 3. The distance is a sum total of absolute values of differentials between respective elements of the photographic pixel data array and corresponding elements of the comparison data array.

The present invention of claim 5 is an entertainment apparatus according to claim 3. The distance is a sum total of squares of differentials between the respective elements of the photographic pixel data array and the corresponding elements of the comparison data array.

The present invention of claim 6 is an entertainment apparatus according to any one of claims 2 to 5. The photographic pixel data array forming means forms the photographic pixel data array with assignment of a predetermined weight to each element of the data array.

The present invention of claim 7 is an entertainment apparatus according to any one of claims 2 to 6. The card identification means includes a threshold value determination means for determining whether or not the sum total of differentials is larger than a predetermined threshold value, and excludes any entry with the sum total of differentials larger than the predetermined threshold value from identification candidates.

The present invention of claim 8 is an entertainment apparatus according to claim 7. The card identification means includes a number-of-candidates determination means for determining a total number of candidates which are left as a result of determination made by the threshold value determination means. When the number-of-candidates determination means determines that the number of candidates is "0", the card identification means does not obtain any card ID. When the number-of-candidates determination means determines that the number of candidates is "1", the card identification means obtains the card ID of the identification candidate.

The present invention of claim 9 is an entertainment apparatus according to claim 8, taking the database as a first database and further comprising a second database including one or more entries. Each of the entries includes a plurality of candidate card IDs and one determination card ID. The card identification means includes a number-of-candidates determination means for determining whether two or more identification candidates are left or not. When the number-ofcandidates determination means determines that the number of candidates is "2 or more", the card identification means searches the second database for an entry in which there is a match between a combination of card IDs of the left candidates and a combination of the candidate card IDs in said second database. If there exists any matching entry, the card identification means obtains the determination card ID of the entry.

The present invention of claim 10 is an entertainment apparatus according to any one of claims 1 to 9. The database includes card data corresponding to each entry. The information processing means includes a card data display means for displaying at least the design based on the card data of the entry corresponding to the card ID obtained by the card identification means.

The present invention of claim 11 is an entertainment apparatus according to any one of claims 1 to 10, further comprising a cartridge connector. The cartridge connector is equipped with a memory cartridge and the memory cartridge stores another database.

The present invention of claim 12 is an entertainment apparatus which obtains inputs from a plurality of cards on each of which a visually human-identifiable design is printed, and performs information processing according to the inputs. The entertainment apparatus using cards comprises a photographing means for photographing the design of the card to fetch a photographic pixel data array; a card identification means for obtaining a data string corresponding to the design from the photographic pixel data array; and an information processing means for performing the information processing with the data string obtained by the card identification means as an input.

The present invention of claim 13 is an entertainment apparatus according to any one of claims 1 to 12, further comprising a card photographing part for setting a card in a predetermined position and a light source for irradiating light to a surface to be photographed of the card set in the card photographing part.

The present invention of claim 14 is an entertainment apparatus according to claim 12, further comprising a reflection means for diffusely reflecting light from the light source and letting the light enter the surface to be photographed.

The present invention of claim 15 is an entertainment apparatus according to claim 13 or 14, further comprising a photographing part cover for covering the card photographing part, the cover having a position correction mark on a surface opposite to the photographing means; and a photographic pixel data fetching area correction means for correcting a fetching area of photographic pixel data based on the position correction mark. The photographing means photographs the position correction mark under a state where no card is set in the card photographing part.

Claim 16 is a method of identifying a card by photographing a plurality of cards on each of which a visually human-identifiable design is printed. The card identifying method includes steps of: (a) preparing a database including a plurality of entries individually corresponding to the plurality of cards, each of the entries including a pair of card ID and comparison data array; (b) photographing the design by an image sensor and obtaining a photographic signal; (c) sampling the photographic signal at a first resolution and forming a data array; (d) re-sampling the data array at a second resolution which is lower than the first resolution and forming a photographic pixel data array; and (e) searching the database for a specific comparison data array based on the photographic pixel data array and obtaining the card ID pairing up with the specific comparison data array.

Claim 17 is a card identifying method according to claim 16. In the step (e), a distance between the photographic pixel data array and the comparison data array is calculated, and the card ID of the entry with the comparison data array at the shortest distance is obtained.

In the present invention of claim 1, a plurality of cards (30: a reference numeral for a corresponding element or component in the embodiments. The same can be said for the following ones.) are employed. Each of the cards includes a design printed in such a manner as to be visually human-identifiable. The entertainment apparatus photographs the design of a card so as to identify which is that card, and performs information processing by use of a processor (64), for example, taking the card ID of the identified card as an input. More specifically, the photographing means (64, S139, S147, S149) includes an image sensor (54) and fetches a photographic pixel data array from an photographic signal from the image sensor. On the other hand, the database (67A) is provided with a pair of card ID and comparison data array for each of a plurality of entries individually corresponding to the plurality of cards. The card identification means (64, S151) searches such a database for a specific comparison data array based on the photographic pixel data array, and outputs a card ID paring up with the specific comparison data array. Then, the information processing means such as the processor (64) performs information processing e.g., computer game processing, taking as an input the card ID obtained in such a way.

According to claim 2, the photographing means includes the image sensor (54) for photographing a design and outputting a photographic signal. The photographic signal is supplied to the data array forming means (S77). The data array forming means samples the photographic signal at a first resolution and forms a data array. In the embodiments, the photographic pixel data array forming means (S147) re-samples the data array of the first resolution at a second resolution which is lower than the first one and forms a photographic pixel data array. If required, however, the photographic pixel data array may be formed by carrying out a direct current component elimination and normalization process.

In the present invention of claim 2, the photographic pixel data array is formed through re-sampling at the second resolution, which makes it possible to reduce a load of processing for identification and a size of database while assuring a required accuracy of identification.

In the present invention of claim 3, the card identification means calculates a distance between the photographic pixel data array and the comparison data array, and obtains the card ID of the entry with the comparison data array at the shortest distance.

In the present invention of claim 4, the distance is a sum total of absolute values of differentials between elements of the photographic pixel data array and elements of the comparison data array corresponding thereto.

In the present invention of claim 5, the distance is a sum total of squares of the differentials between the elements of the photographic pixel data array and the elements of the comparison data array corresponding thereto.

According to claims 3 to 5, card identification can be easily performed with reference to the database.

In claim 6, the photographic pixel data array forming means forms the photographic pixel data array by assigning a predetermined weight to each element of the data array with the use of a two-dimensional window function (FIG. 26), for example.

According to claim 6, it is possible to obtain a re-sampled pixel value that reflects pixels near a center more highly by increasing the weight of pixels near the center and decreasing the weight of pixels distant from the center at a time of re-sampling.

In claim 7, when the threshold determination means (S183) determines that the sum total of differentials in some entry is larger than a predetermined threshold value, the entry is excluded from identification candidates (S189).

In claim 8, when the first number-of-candidates determination means (S193) determines that the number of candidate is "0", a status is "No card is matching" and no card ID is obtained (S195). Also, when the second number-of-candidates determination means (S197) determines that the number of candidate is "1", the card ID for that identification candidate is obtained (S199).

In claim 9, the second database (67B) is further provided. When the number-of-candidates determination means (S197) determines that the number of candidates to be "2 or more", the second database is searched for an entry in which there is a match between a combination of card IDs for the remaining candidates and a combination of candidate card IDs in a step S217, for example. If there exists any matching entry, the determination card ID of the entry is obtained.

According to the specific technique of identification in claims 5 to 9, it is possible to identify one card in a secure manner.

In claim 10, the card data display means (S127, 100) displays a design and other required card information according to the card data read from the database (67A).

According to claim 10, it is possible to see how the card provided by a player has been identified or recognized. This offers the player the reliability of the entertainment apparatus.

In claim 11, when inserted into the cartridge connector (68), the memory cartridge (34) is linked with the processor through the cartridge connector. Therefore, the employment of the memory cartridge makes it possible to add, update and change a database. In addition, using the memory cartridge also allows the addition, update and change of software.

The present invention of claim 12 utilizes a plurality of cards (30). Each of the cards includes a design printed in such a manner as to be visually human-identifiable. The entertainment apparatus includes a photographing means. The photographing means (64, S139, S147, S149) includes an image sensor (54), and fetches a photographic pixel data array out of a photographic signal from this image sensor. The card identification means obtains a data string by processing this photographic pixel data array. Such an information processing means like a processor (64) performs information processing, taking as an input the data string obtained in such a way.

In claim 13, a surface to be photographed of a card set in the card photographing part (28) is irradiated with light from a light source, i.e., an LED (58).

As described in claim 14, using the reflection means (60) makes it possible to evenly irradiate the surface to be photographed of the card.

In claim 15, the card photographing part cover (26) is provided with a position correction mark (62) on a surface opposite to the photographing means, i.e., a back side (27). The photographing means photographs the position correction mark in a state where no card is set in the card photographing part, which allows the photographic pixel data fetching area correction means (S21, S23) to correct an photographic pixel data fetching area.

According to claim 15, it is possible to photograph the design of a card in a secure manner even if there occurs a position error in the image sensor, etc.

In claim 16, the photographic signal obtained from the design photographed by the image sensor, is sampled at a first resolution to form a data array. The data array is re-sampled at a second resolution which is lower than the first resolution to form a photographic pixel data array. Then, the database is searched for a specific comparison data array based on the photographic pixel data array, and the card ID pairing up with the specific comparison data array is obtained.

In claim 17, in the card identification step (S151, S181), a distance between the photographic pixel data array and the comparison data array (for example, Euclid distance, Hamming distance, etc.) is calculated, and the card ID of the entry in the comparison data array at the shortest distance is acquired.

According to the present invention, a card can be identified if only a design is printed on it. Thus, this makes it possible to enjoy such an entertainment as a card game, using even a card with no identification code that has become already distributed on the market.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 7 is an illustrative view showing one example of a database A;

FIG. 8 is an illustrative view showing one example of a database B;

BEST MODE FOR PRACTICING THE INVENTION

Figure 1:
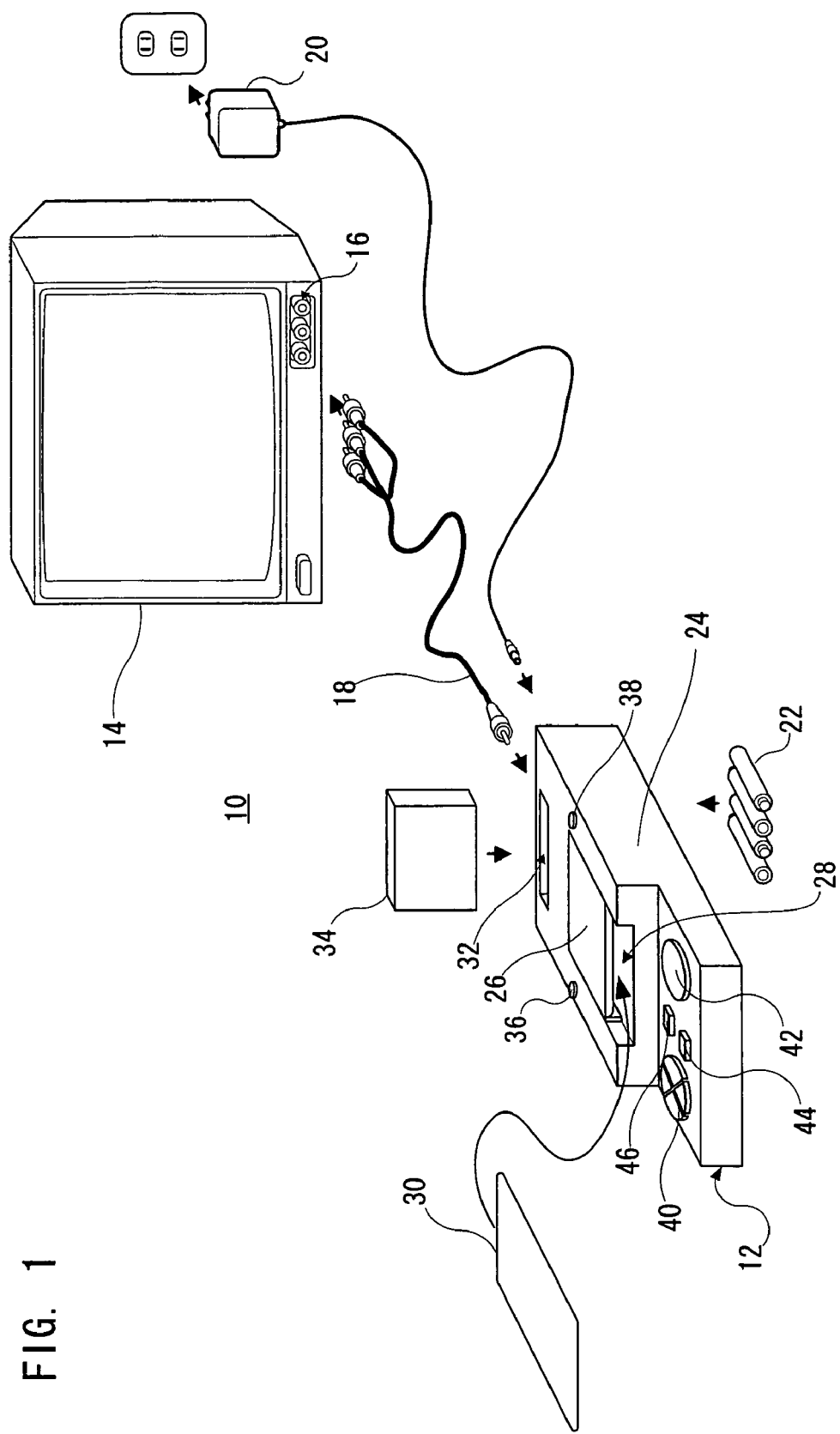
FIG. 1 is an illustrative view showing an overall structure of a card game system of one embodiment of the present invention.

Referring to FIG. 1, a card game system 10 of one embodiment of the present invention includes a card game machine (hereinafter sometimes referred to simply as "game machine") 12 and a television monitor 14 such as a home television receiver set. The game machine 12 is connected to an AV terminal 16 of the television monitor 14 through an AV cable 18. Also, the game machine 12 is supplied with a direct-current power by an AC adapter 20 which may, however, be replaced with a battery 22.

Figure 2:
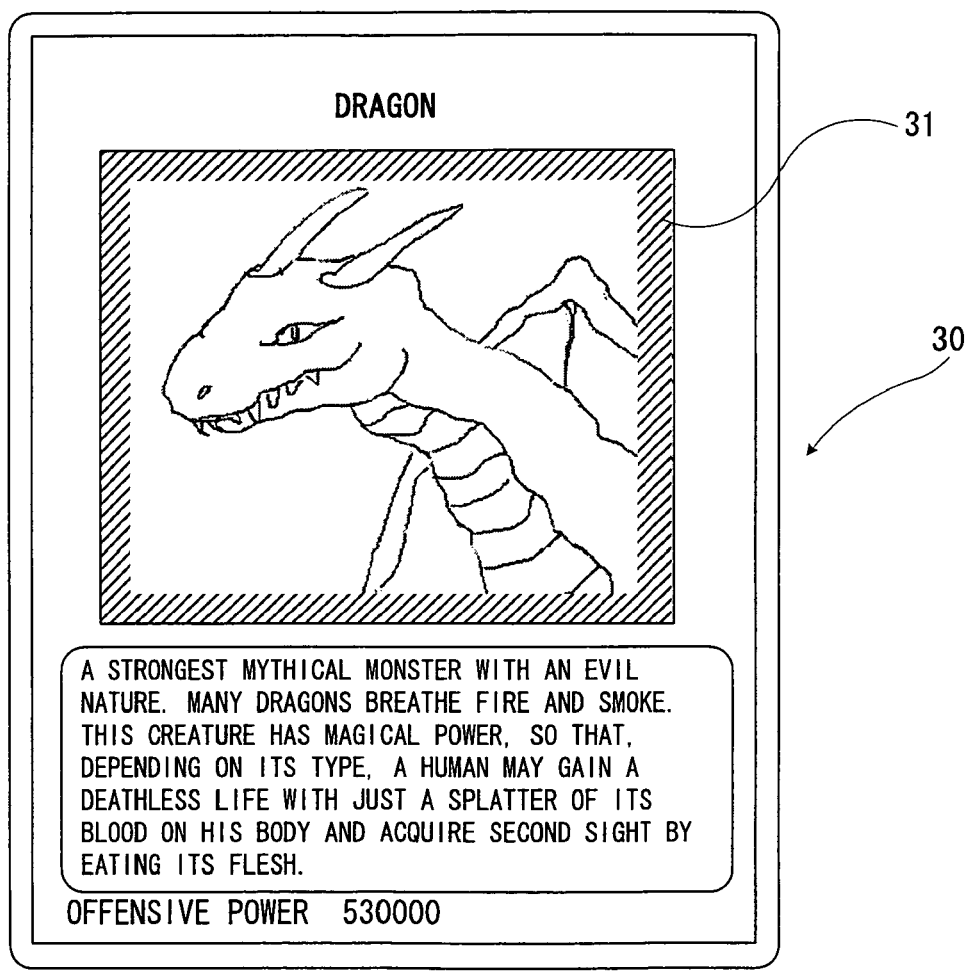
FIG. 2 is an illustrative view showing one example of a card used in FIG. 1 embodiment.

The game machine 12 also includes a housing 24. A top surface of the housing 24 is formed in a step-wise manner and has an upper step and a lower step. Provided on a top surface of the upper step of the housing 24 is a card photographing part cover 26. A clearance is created between a bottom surface of the cover 26 and the top surface of the housing 24, which constitutes a card insertion part 28. More specifically, a card 30 as specifically shown in FIG. 2 is inserted into the card insertion part 28, and a design display part 31 of the card 30 (FIG. 2) is photographed in a manner described later.

A cartridge insertion slot 32 is formed on the top surface of the upper step of the housing 24 at a back of the cover 26. A cartridge 34 is inserted into the cartridge insertion slot 32. As described later, the cartridge 34 is electrically joined with a game processor via a connector. A power switch 36 and a reset switch 38 are provided at either end of the cover 26 on the upper step of the housing 24.

A direction key 40 and a decision and card photographing key 42 are provided at either end of the top surface of the lower step of the housing 24A. The direction key 40 has individual buttons for four directions (up, down, left and right), and is used to move a cursor for selection of a menu or a game mode. The decision and card photographing key 40 is employed to confirm input to the game machine 12 and is pressed to photograph a card inserted into the card insertion slot 26. A cancel key 44 and a pause key 46 are provided on the top surface of the lower step of the housing 24 between the two buttons 40 and 42. The cancel key 44 is used to cancel the input to the game machine 12. The pause key 46 is utilized to stop the operation temporarily.

Figure 3:
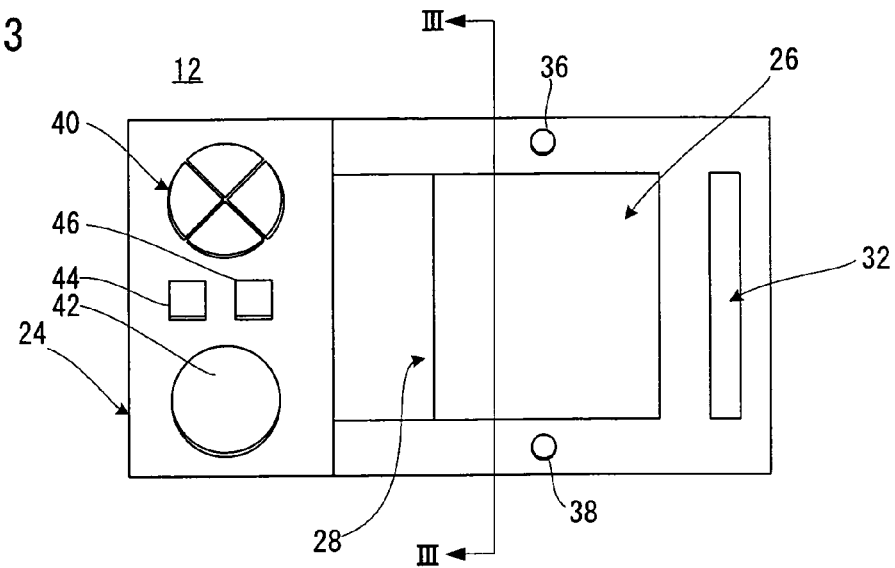
FIG. 3 is an illustrative view of a card game machine of FIG. 1 embodiment as seen from above.
Figure 4:
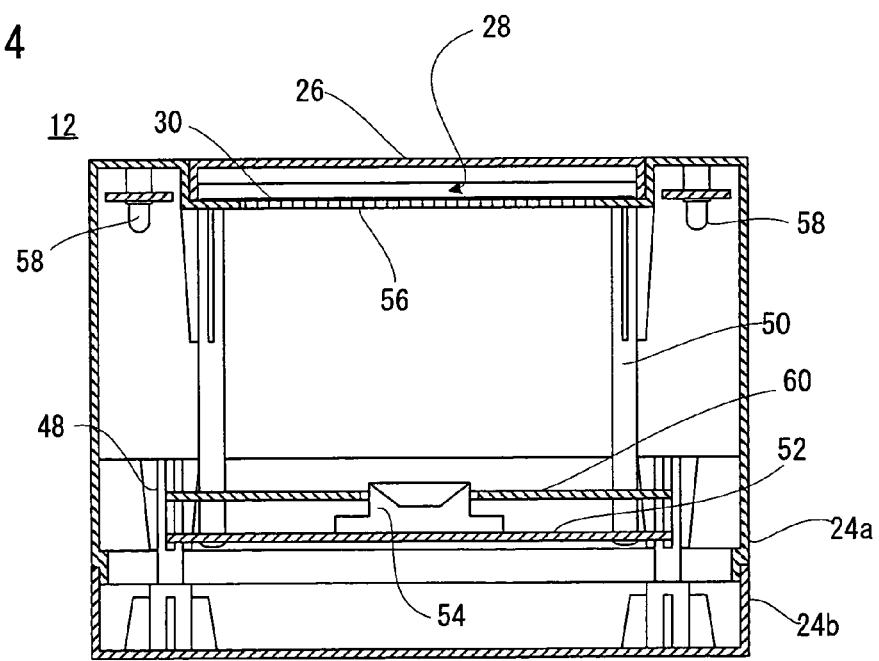
FIG. 4 is a sectional view of the card game machine of FIG. 1 embodiment as seen from a line III-III in FIG. 2.

FIG. 3 and FIG. 4 illustrate in more detail the card game machine 12 of FIG. 1 embodiment. More specifically, the game machine 12 has the housing 24 as mentioned above. The housing 24 consists of an upper housing 24a and a lower housing 24b both of which are formed by plastic injection molding. The upper and lower housings 24a and 24b are coupled to each other by a boss 48 for joining upper and lower housings to constitute a single housing 24. The upper housing 24a is provided with a board boss 50 in such a manner as to hang from a ceiling thereof. A printed circuit board 52 is screwed to an end (lower end) of the board boss 50. Attached on the printed circuit board 52 are an image sensor 54, its related components, and electronic parts such as a game processor 64 (FIG. 6) described later so as to constitute a required circuit.

The image sensor 54, although not illustrated in detail, includes a unit base and a support cylinder supported by the unit base, both of which are formed by plastic injection molding, for example. As can be seen well from FIG. 4, formed on an upper surface of the support cylinder is a trumpet-shaped opening whose inside is in a shape of an inverted circular cone. Also, provided inside a cylindrical part below the opening is an optical system including a concave lens and a convex lens both of which are formed by transparent plastic molding, for example. An imaging element is fixed below the convex lens. This allows the image sensor 54 to photograph an image corresponding to incident light through a lens system from the upper opening of the support cylinder. For a more specific structure, refer to FIG. 2 of copending Japanese Patent Application No. 2002-346052 relating to the invention of the same inventor. It is noted that a low-resolution CMOS image sensor (e.g. 32×32 pixels: gray scale) is used as the image sensor 54 in this embodiment. However, pixels of the photographing element of the image sensor 54 may be more increased in number and another imaging element such as a CCD may be employed.

A transparent resin board 56 is fitted into the ceiling of the upper housing 24a and also below the cover 26, and the card 30 (FIG. 2) inserted through the card insertion part 28 (FIG. 3) is placed on the resin board. A design 31 of the card 30 is supposed to be photographed by the image sensor 54, but photographing by the image sensor 54 could not be successfully performed as it is because the card 30 is surrounded by the components and thus is under considerably dark conditions. In this embodiment, therefore, a plurality (four in this embodiment) of red light emitting diodes (hereinafter sometimes called as "LED") 58 are provided within the upper housing 24a so that light from the LED 58 is reflected within the housing 24 and is irradiated onto the surface to be photographed of the card 30 through the transparent resin board 56. In order for the reflection of the light to take place more efficiently, a light reflector 60 is provided above the printed circuit board 52. The light reflector 60 in this embodiment is a white resin board whose surface is mat-finished. Mat finish is an idea for illuminating the entire surface to be photographed as evenly as possible by diffusely reflecting the light from the LED 58. Alternatively, another surface roughening process may be employed. In addition, the reflector 60 may be made of a material other than plastic, such as paper.

Incidentally, a red LED is used in this embodiment. However, an LED of different color or a light source other than LED may be utilized. Moreover, if color photography is required, a white light source should be used as a light source to that effect.

Figure 5:
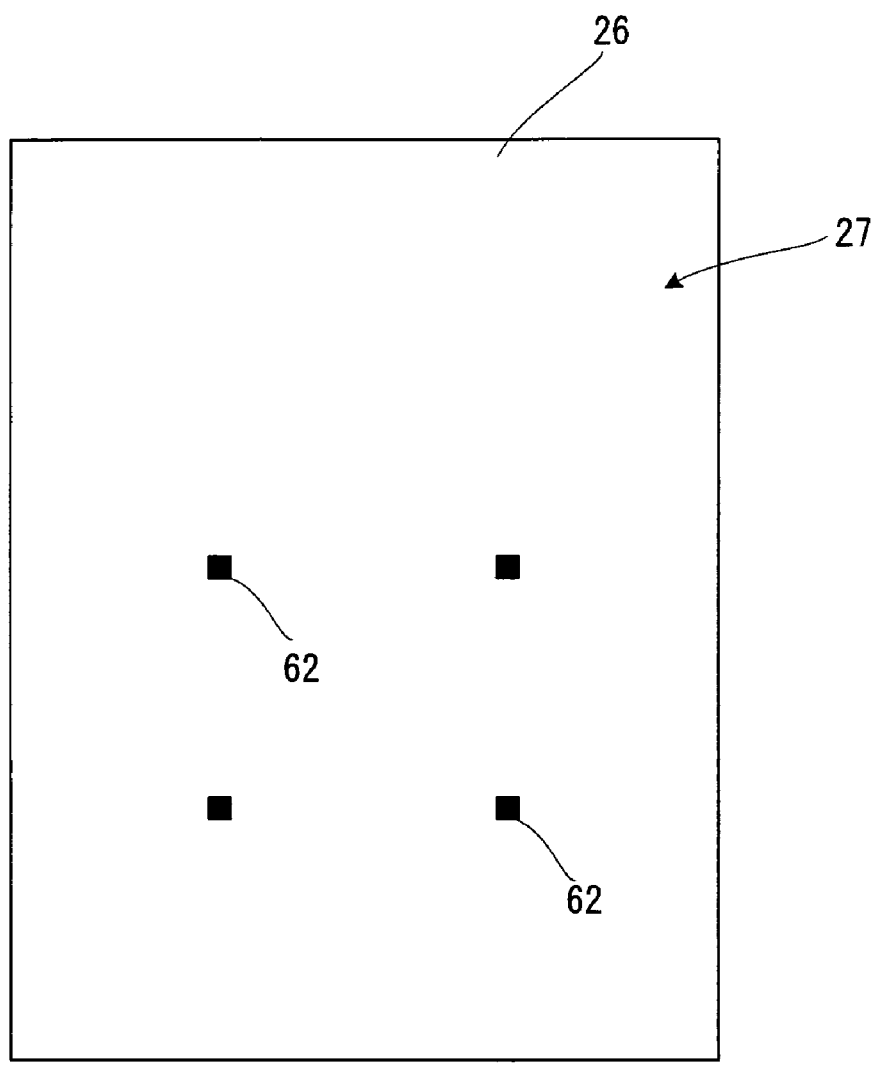
FIG. 5 is an illustrative view showing a back side of a card photographing part cover of the card game machine of FIG. 1 embodiment.

It is noted that an inside surface 27 (FIG. 5) of the photographing part cover 26 is also molded of white plastic (or paper) so that light reflection can be done in an efficient way. Therefore, the surface to be photographed of the card 30 is also illuminated by the light reflected from the inside surface 27 of the cover 26. Additionally, formed on the inside surface 27 of the cover 26 are a plurality (four in this embodiment) of black marks 62. These four marks 62 are intended to detect a position error of the image sensor 54 or other components (resulting from a deviation in attachment position and variations in component dimensions) and correct or calibrate the position error. In short, a center of an area surrounded by the four black marks 62 is found and a certain number of pixels covering the center are defined as an effective photographing area. Therefore, even if there are any variations in attachment position or dimensions of the image sensor 54, etc. among individual game machines, an effective photographing area is defined for each game machine and thus it is possible to photograph the design 31 (FIG. 2) of the card 30 in a secure manner.

Figure 6:
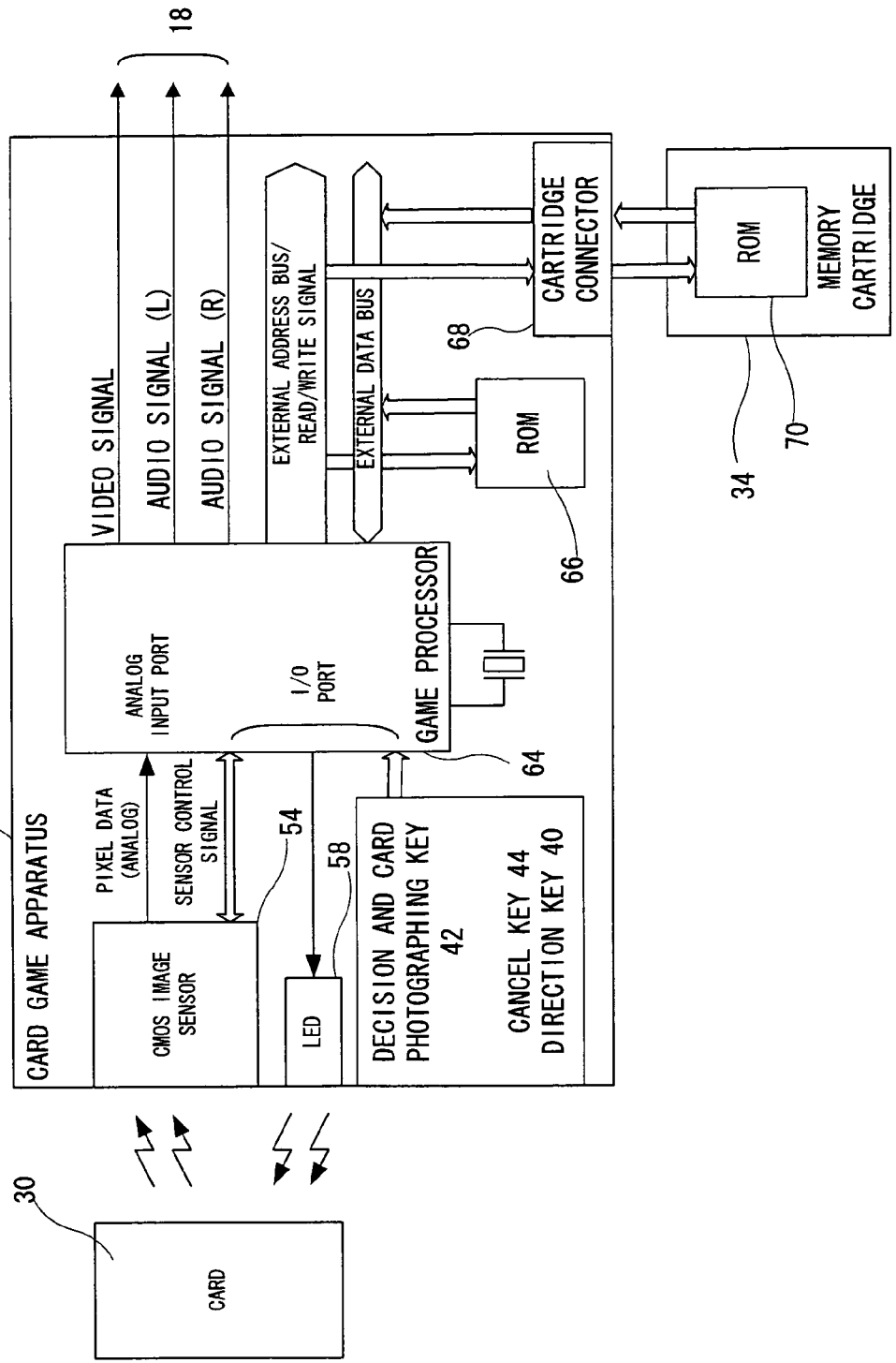
FIG. 6 is a block diagram showing FIG. 1 embodiment.

Referring to FIG. 6, the design 31 printed on the card 30 is irradiated with the light from the red light emitting diode 58 and is photographed by the image sensor 54. Thus, an image signal of the card design is output from the image sensor 54. The analog image signal from the image sensor 54 is converted into digital data by an A/D converter (not shown) included in a game processor 64.

Although arbitrary kinds of processor can be utilized as such the game processor 64, a high-speed processor developed by the applicant of the present invention and already filed as a patent application is used in this embodiment. This high-speed processor is disclosed in detail in Japanese Patent Laying-open No. H10-307790 [G06F13/36, 15/78] and U.S. Pat. No. 6,070,205 corresponding thereto.

Although not illustrated, the game processor 64 includes various processors such as a CPU, a graphics processor, a sound processor, a DMA processor, etc. and also includes the above-described A/D converter used for fetching an analog signal, and an input/output control circuit for receiving an input signal such as a key operation signal and an infrared signal, and giving an output signal to external equipment. Therefore, an input signal from the operation keys 42 to 46 is applied to the CPU through the input/output control circuit. The CPU executes a required operation according to the input signal, and applies the result to the graphics processor, the sound processor, etc. Therefore, the graphic processor and the sound processor execute an image processing and a sound processing according to the operation result.

Although not illustrated, the processor 64 is provided with an internal memory, and the internal memory includes a ROM or a RAM (SRAM and/or DRAM). The RAM is utilized as a temporary memory, a working memory, a counter, or a register area (temporary data area), and a flag area. It is noted that the processor 64 is connected with a ROM 66 via an external bus. In the ROM 66, a game program described later and a card identification database are set in advance.

The game processor 64 processes a digital image signal input from the image sensor 54 via the A/D converter to identify which card is currently located in the card photographing part, and executes an arithmetic operation, a graphic processing, a sound processing, etc. according to an input signal from the operation keys 40 to 46 to output a video signal and an audio signal. The video signal is an image signal for displaying a game screen, and the audio signal is a signal for a game music and a sound effect. Accordingly, a game screen is displayed on the screen of a television monitor (not shown), and a necessary sound (sound effect, game music) is output from its speaker.

The card game machine 12 of this embodiment further has a cartridge connector 68 connected to an external bus. The cartridge connector 68 is provided at a back of the cartridge insertion slot 32 shown in FIG. 1. The cartridge connector 68 is connected with the cartridge 34 as required. The cartridge 34 contains an external ROM 70. As an example, the ROM 70 stores an identification database so as to, when the kind of card to be identified has been changed, accommodate cards of the new kind. In this case, therefore, the cartridge 34 is used together with the internal ROM 66.

However, as done in the case of copending Japanese Patent Application No. 2002-132509 related to the application of the same applicant, the cartridge 34 may also be used to start another program. In this case, the ROM 70 needs to be pre-configured with the program as well as the card identification database.

More specifically, in one embodiment, the ROM 70 in the memory cartridge 34 stores data for addition, update or exchange of data in a database described later. On the contrary, in another embodiment where a different program is started, the ROM 70 needs to store some data and programs for addition, update or exchange of software besides the above mentioned database data.

One example of identification database is shown in FIG. 7 and FIG. 8. An identification database 67A of FIG. 7 stores a comparison pixel value for each pixel (re-sampled pixel) after an effective area (24×24=576 pixels in this embodiment) has been re-sampled (to be described later) by 3×3 pixels, and compares it with a pixel value (re-sampled pixel value) for each pixel after a photographic signal at that time has been processed and re-sampled. Also, strictly speaking, it is somewhat inappropriate to use the term "pixel" in the context after a re-sampling process because there exist nine pixels originally. However, the term "re-sampled pixel" is here used for convenience's sake in the meaning that "the original nine pixels have been re-sampled into one".) If the re-sampled pixel value obtained from the photographic data of the card at that time matches the comparison pixel value stored in the database 67A, the card can be identified as a card of "entry #2", for example.

As shown in FIG. 7, the database 67A is preconfigured with card data (design, name, characteristics, power value, etc.) of a card for each entry, which is represented by a card ID to be specified by its entry. As explained later, when a card is specified during the game play, a card screen 100 (FIG. 3) is displayed by use of the card data.

The database 67A of FIG. 7 is a database for identifying one card by a comparison of re-sampled pixel values. If the pixel value of each re-sampled pixel matches a reference value of the database 67A, it is possible to determine that the card photographed at that time is a card indicated by any one of the entries. However, a match do not always occurs in all the re-sampled pixel values. Identification of the card becomes impossible if there exist differences in pixel values of some re-sampled pixels. This would not allow the card game to proceed, and it is thus necessary to identify the card even if there is no match. An identification database 67B of FIG. 8 is a database to be used in such a case. More specifically, if one card cannot be identified and a plurality of candidates for it remains to the last, the database 67B of FIG. 8 is used in order to identify the card from the candidates.

The database 67B of FIG. 8 stores entry numbers (#) identified by using the database of FIG. 7, as identification card IDs. For example, if there are two finally remaining candidates recognized as a #22 card and a #4 card, the card in question is identified as the #4 card. More specifically, the database 67B of FIG. 8 stores sequential recognition results as candidate patterns, and lastly identifies one card with a matching candidate pattern in the recognized sequence.

It is noted that the databases 67A and 67B shown in FIG. 7 and FIG. 8 are supposed to be stored in the internal ROM 66 (FIG. 6). However, if the cartridge 34 is employed, it is naturally possible to establish similar databases in the external ROM 70 as well.

Figure 9:
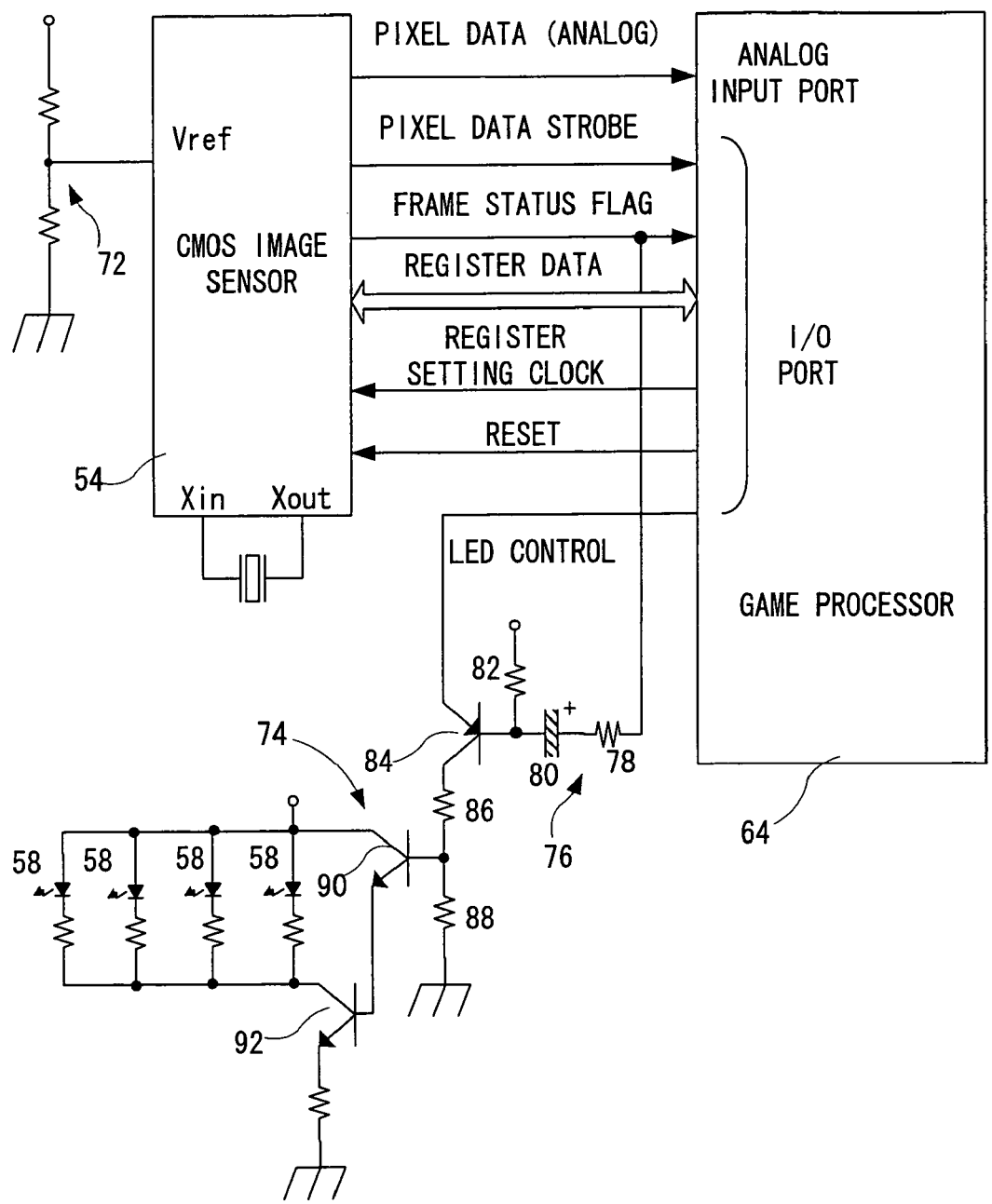
FIG. 9 is a circuit diagram showing a structure for fetching pixel data from an image sensor into a game processor, and an LED driving circuit in FIG. 6 embodiment.
Figure 10:
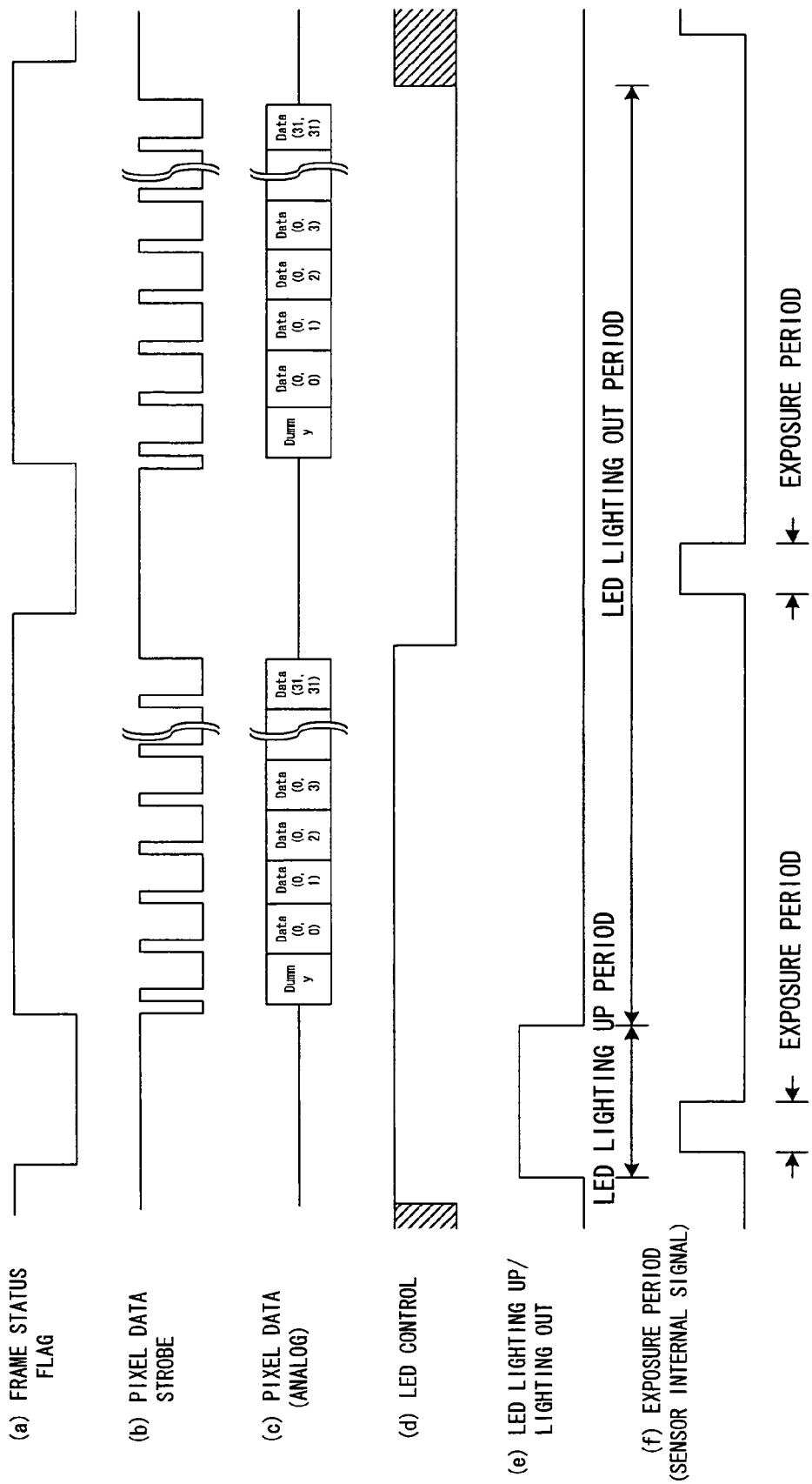
FIG. 10 is a timing diagram showing an operation of FIG. 9 embodiment.
Figure 11:
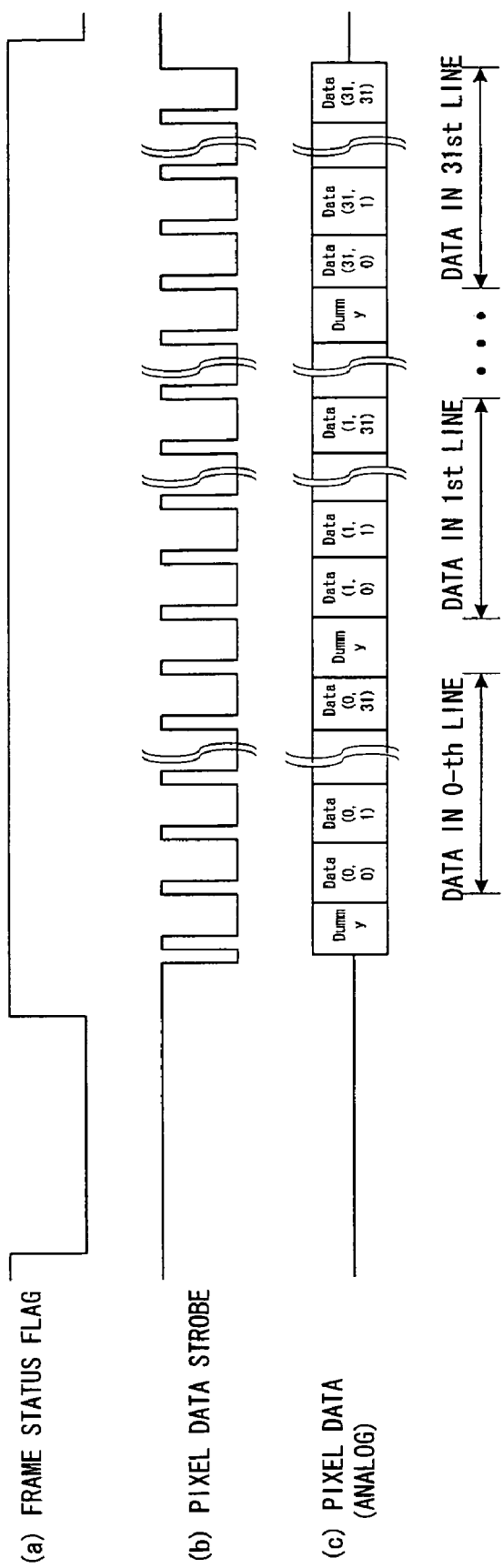
FIG. 11 is a timing diagram showing one enlarged part of FIG. 10.

Here, with referring to FIG. 9 to FIG. 11, a configuration for fetching pixel data to the game processor 64 from the COMS image sensor 54 is described in detail. As shown in FIG. 9, the CMOS image sensor 54 in this embodiment is a type of outputting a pixel signal as an analog signal, and therefore, the pixel signal is input to an analog input port of the game processor 64. The analog input port is connected to an A/D converter (not shown) within the game processor 64, and thus, the game processor 64 obtains or fetches from the A/D converter the pixel signal (pixel data) that has been converted to digital data.

A midpoint of the above-described analog pixel signal is determined by a reference voltage applied to a reference voltage terminal Vref of the CMOS image sensor 54. Therefore, in this embodiment, as to the image sensor 54, a reference voltage generating circuit 72 including a resistor voltage-dividing circuit, for example, is provided, and from the reference voltage generating circuit 72, a reference voltage having a constant magnitude is always applied to the reference voltage terminal Vref.

Each of digital signals for controlling the CMOS image sensor 54 is applied to the I/O port of the game processor 64, or output therefrom. The I/O ports are digital ports capable of controlling respective input/outputs, and connected to an input/output control circuit (not shown) within the game processor 64.

More specifically, from the output port of the game processor 64, a reset signal for resetting the image sensor 54 is output so as to be applied to the image sensor 54. Furthermore, from the image sensor 54, a pixel data strobe signal and a frame status flag signal are output, and these signals are applied to the input port of the game processor 64. The pixel data strobe signal is a strobe signal as shown in FIG. 10(*b*) for reading each of the pixel signals described above. The frame status flag signal is a flag signal for showing a state of the image sensor 54, and defines an exposure period of the image sensor 54 as shown in FIG. 10(*a*). A low level of the frame status signal shown in FIG. 10(*a*) indicates an exposure period, and a high level thereof shown in FIG. 10(*a*) indicates a non-exposure period.

Furthermore, the game processor 64 outputs from the I/O port a command (or command+data) set in a control register (not shown) within the CMOS image sensor 54 as register data, and outputs a register setting clock in which the high level and the low level are repeated and applies it to the image sensor 54.

It is noted that as the infrared-LED 58, four (4) infrared-LEDs 58, 58, . . . connected in parallel with each other are utilized as shown in FIG. 9. These four (4) infrared-LEDs 58 are arranged such that they irradiate the object (the card 30 to be photographed) as described above, and surround the image sensor 54. The LED 58 is turned on and is extinguished (turned off) by the LED driving circuit 74. The LED driving circuit 74 receives the above-described frame status flag signal from the image sensor 54, and the flag signal is applied to a base of a PNP transistor 84 through a differentiation circuit 76 consisting of a resistor 78 and a capacitor 80. The PNP transistor 84 is connected with a pull-up resistor 82, and the base of the PNP transistor 84 is normally pulled up to a high level. Then, when the frame status signal becomes a low level, the low level is input to the base through the differentiation circuit 76, and the PNP transistor 84 is turned on only during a low level period of the flag signal.

An emitter of the PNP transistor 84 is grounded via resistors 86 and 88. Then, a node of emitter resistances 86 and 88 is connected to the base of an NPN transistor 90. A collector of the NPN transistor 90 is commonly connected to anodes of the respective infrared-LEDs 58. An emitter of the NPN transistor 90 is directly connected to a base of another NPN transistor 92. A collector of the NPN transistor 92 is commonly connected to cathodes of the respective LEDs 58, and the emitter thereof is grounded.

In the LED driving circuit 74, the LED 58 is turned on during only a period when the LED control signal (corresponding to a second signal) output from the I/O port of the game processor 64 is active (high level), and the frame status flag signal from the image sensor 54 is a low level. As shown in FIG. 10(*a*), when the frame status flag signal becomes the low level, the PNP transistor 84 is turned on during the low level period (although there is a delay due to the time constant of the differentiation circuit 76 in reality). Accordingly, when the LED control signal shown in FIG. 10(*d*) is output from the game processor 64 at the high level, the base of the NPN transistor 90 becomes a low level, and then, the transistor 90 is turned off. When the transistor 90 is turned off, the transistor 92 is turned on. Accordingly, a current flows a power supply (shown by a small white circle in FIG. 9) through the respective LEDs 58 and the transistor 92, and in response thereto, the respective LEDs 58 are turned on as shown in FIG. 10(*e*).

In the LED driving circuit 74 of this embodiment, the LED 58 is turned on only when the LED control signal shown in FIG. 10(*d*) is active and the frame status flag signal is low level, that is, only during an exposure period (see FIG. 10(*f*)) of the image sensor 54. Therefore, according to this embodiment, it is possible to reduce useless power consumption. Furthermore, the frame status flag signal is coupled by the capacitor 80, and therefore, on assumption that the flag signal is suspended with the low level kept due to a hang-up of the image sensor 54 and the like, the transistor 84 is surely turned off after a lapse of a predetermined time period, and the LED 58 is surely turned off after a lapse of the predetermined time period.

Thus, in this embodiment, it is possible to set or change the exposure time period of the image sensor 54 arbitrarily and freely by changing duration of the frame status signal.

In addition, by changing the duration or period of the frame status signal and the LED control signal, it is possible to arbitrarily and freely set or change a light-emission period, a non light-emission period, a duty cycle of light-emission/non light-emission, etc. of the LED 58, that is, the stroboscope.

As described previously, when the surface to be photographed of the card 30, i.e., the design 31 (FIG. 2) is irradiated by an infrared light from the LED 58, the image sensor 54 is exposed by the reflected light from it. In response thereto, the pixel signal described above is output from the image sensor 54. More specifically, the CMOS image sensor 54 outputs an analog pixel signal shown in FIG. 10(*c*) in synchronous with a pixel data strobe shown in FIG. 10(*b*) during a period when the frame status signal shown in the above-described FIG. 10(a) is the high level (a period when the LED 58 is not turned on). The game processor 64, while monitoring the frame status flag signal and the pixel data strobe, obtains a digital pixel data through the A/D converter.

It is noted that the pixel data (pixel signal) is output in an order of lines such as the zero line, the first line, . . . to the thirty-first line as shown in FIG. 11(c). It is noted that single pixel data at the head of each of lines becomes dummy data.

Incidentally, in the above mentioned embodiment, the LED 58 is turned on to irradiate the card 30 only when needed. Alternatively, the LED 58 may stay illuminated while a power switch 36 (FIG. 1) is on.

Next, a description will be given as to functioning or operation of the card game system 10 of the FIG. 1 embodiment, based on the flowcharts in FIG. 12 and later. A game is started by turning the power switch 36 shown in FIG. 1 on. It is noted that the game processor 64 shown in FIG. 6 executes an initialization process in a step S1. A system initialization routine is presented in FIG. 13. In a first step S11 of FIG. 13, a system (hardware) and memory (respective variables) are initialized.

Next, in a step S13, a sensor initialization process is performed. The sensor initialization process includes a data setting process for a control register within the image sensor 54, and more specifically, is performed in accordance with the flowcharts shown in FIG. 14 to FIG. 16 and the timing shown in FIG. 17.

Figure 14:
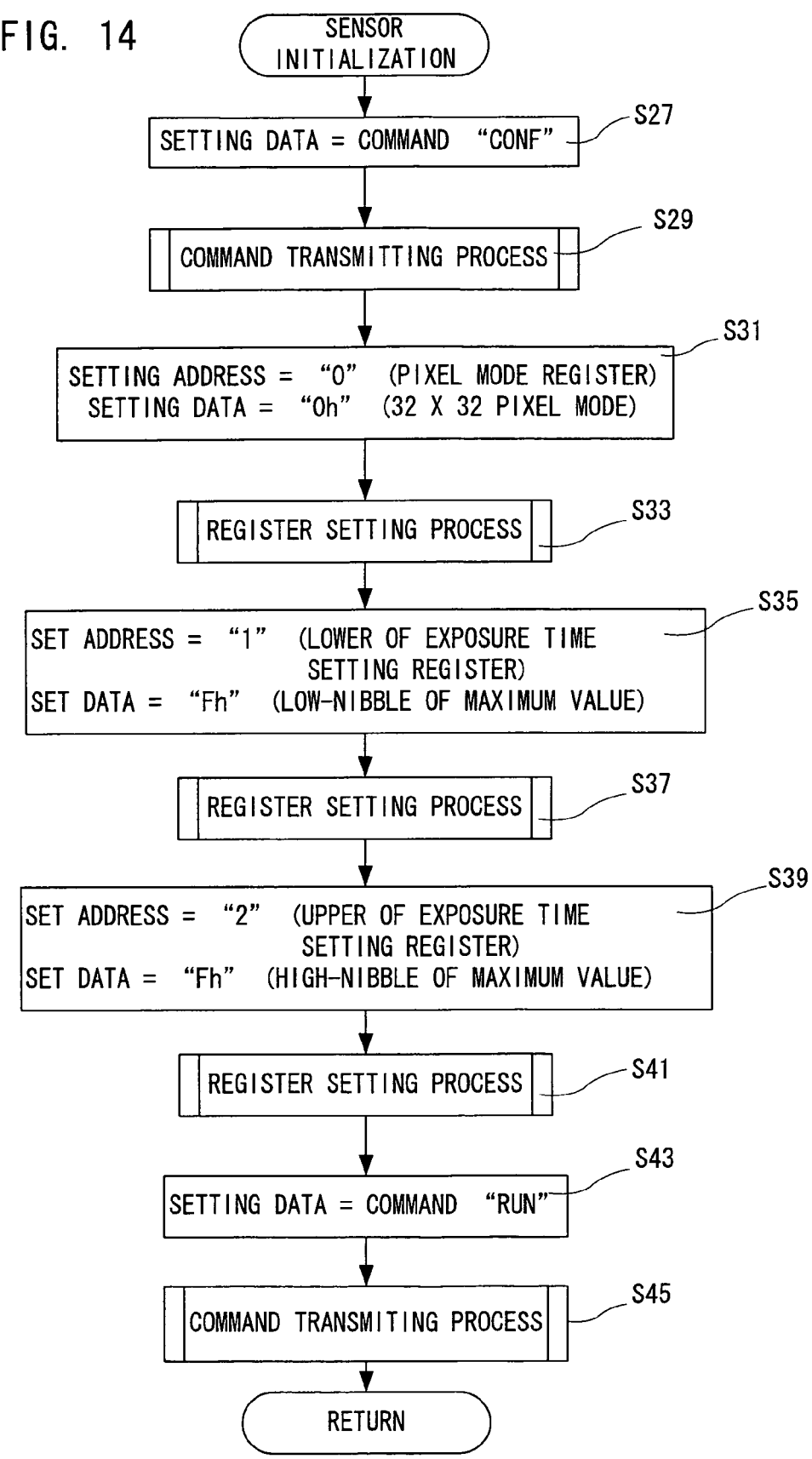
FIG. 14 is a flowchart showing a sensor initialization operation in the system initialization process of FIG. 13 embodiment.
Figure 15:
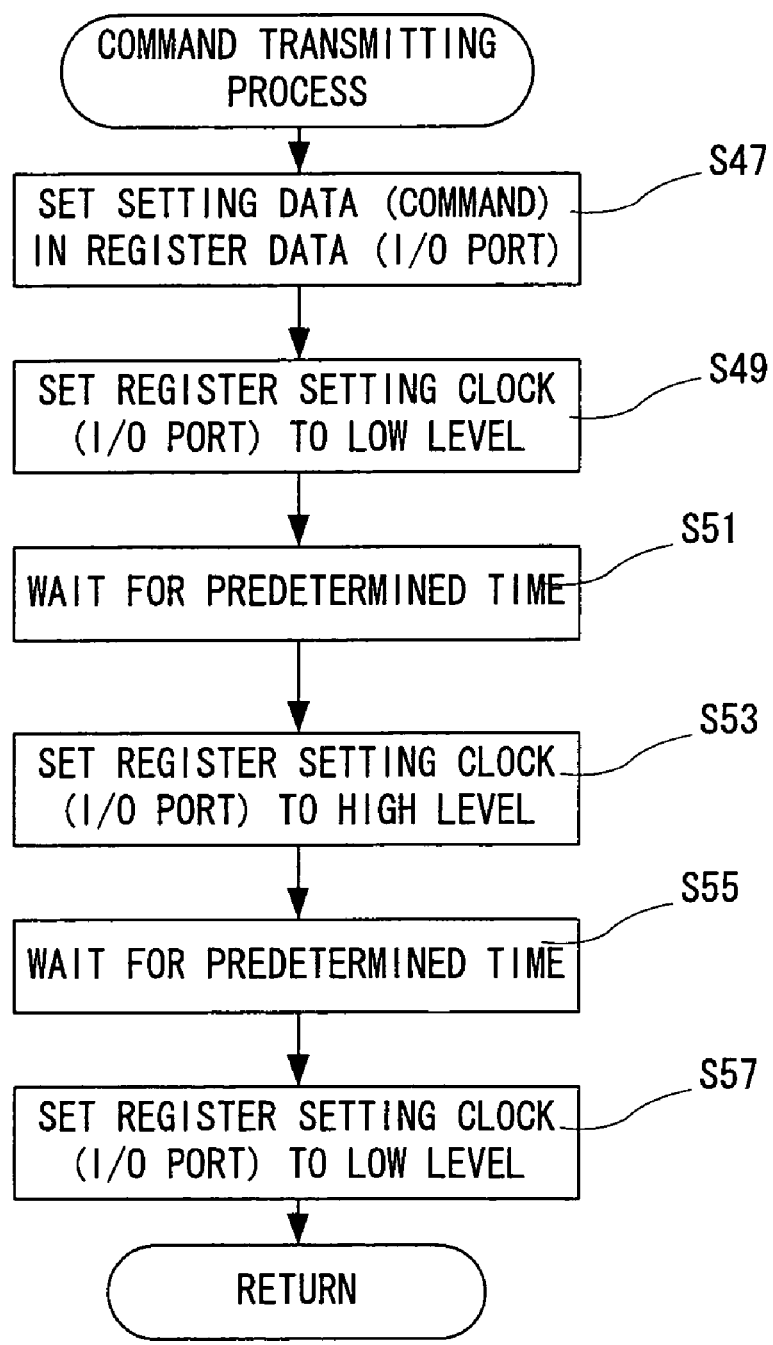
FIG. 15 is a flowchart showing a command transmitting processing operation of FIG. 14.

In a first step S27 shown in FIG. 14, the game processor 64 sets a command "CONF" as setting data. It is noted that the command "CONF" is a command for informing the image sensor 54 of entering the setting mode for transmitting a command from the game processor 64. Then, in a following step S29, a command transmitting process is executed shown in detail in FIG. 15.

Figure 17:
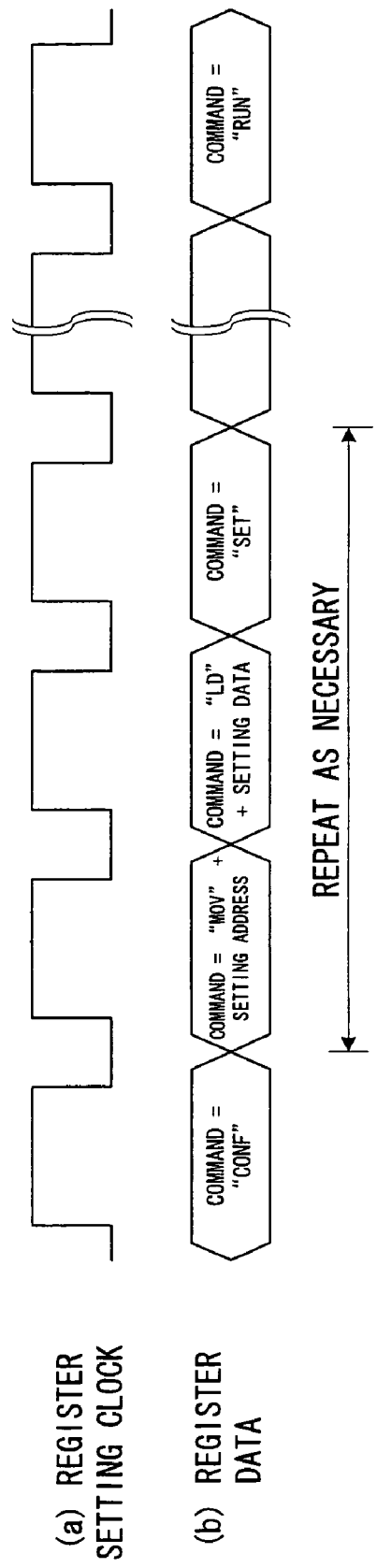
FIG. 17 is a timing diagram showing the register setup processing operation described in FIG. 16.

In a first step S47 of the command transmitting process, the processor 64 sets the setting data (command "CONF" for the step S29) to the register data (I/O port), and sets a register setting clock (I/O port) to a low level in a next step S49. Then, after a wait of a predetermined time period in a step S51, the register setting clock is set to a high level in a step S53. Then, after a wait of a predetermined time period in a step S55, the register setting clock is set to the low level once again in a step S57. Thus, as shown in FIG. 17, by performing the wait of the predetermined time period, the register setting clock is changed to the low level, the high level, and the low level one after another, and whereby, a transmitting process of the command (command or command+data) is performed.

Returning to FIG. 14, in a step S31, a pixel mode is set, and an exposure time period is set. In the case of this embodiment, the image sensor 54 is, as described above, a CMOS sensor of 32×32, for example, and therefore, "0h" indicative of being 32×32 pixels is set to the pixel mode register of the setting address "0". In a next step S33, the game processor 64 executes a register setting process shown in FIG. 16 in detail.

In a first step S59 of the register setting process, the processor 64 sets a command "MOV"+address as a setting data, and, in a following step S61, executes a command transmitting process described above in FIG. 15 to transmit it. The processor 64 sets the command "LD"+data as the setting data in a succeeding step S63, and executes a command transmitting process to transmit it in a following step S65. The processor 64 sets a command "SET" as the setting data in a step S67 to transmit it in a following step S69. It is noted that the command "MOV" is a command indicative of transmitting an address of the control register, the command "LD" is a command indicative of transmitting data, and the command "SET" is a command for actually setting data to its address. It is noted that the process is repeated in a case that there are a plurality of control registers to be set.

Figure 16:
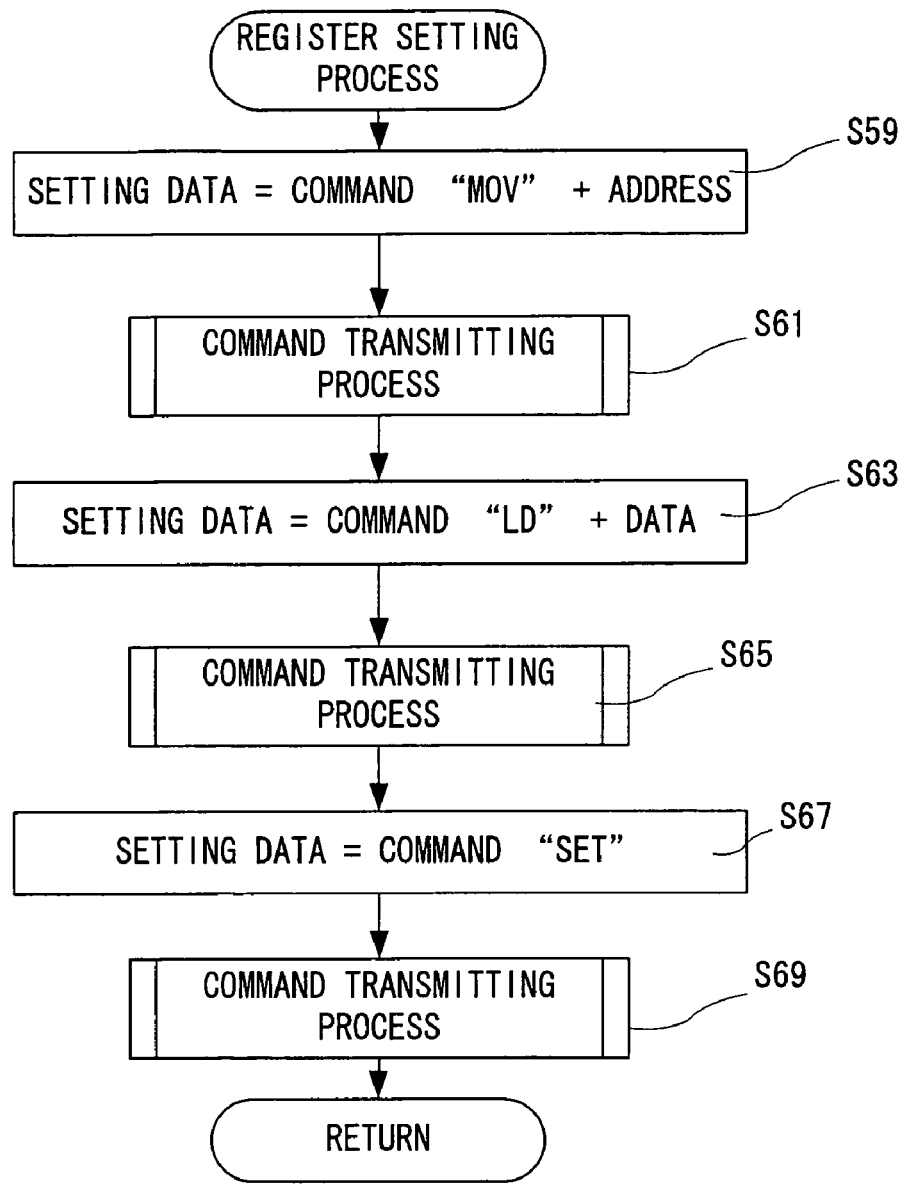
FIG. 16 is a flowchart showing a register setup processing operation of FIG. 14.

Returning again to FIG. 14, in a next step S35, the setting address is rendered "1" (indicative of low-Nibble address of an exposure time setting register), and low-Nibble data "Fh" of "FFh" indicative of a maximum exposure time period is set as data to be set. Then, in a step S37, the register setting process in FIG. 16 is executed. Similarly, in a step S39, the setting address is rendered "2" (indicative of high-Nibble address of an exposure time setting register), and high-Nibble data "Fh" of "FFh" indicative of the maximum exposure time period is set as data to be set, and the register setting process is executed in a step S41.

Then, in a step S43, a command "RUN" indicative of an end of the setting and for starting to output data from the image sensor 54 is set so as to be transmitted in a step S45. Thus, the sensor initialization process is executed in the step S13 shown in FIG. 13.

Figure 13:
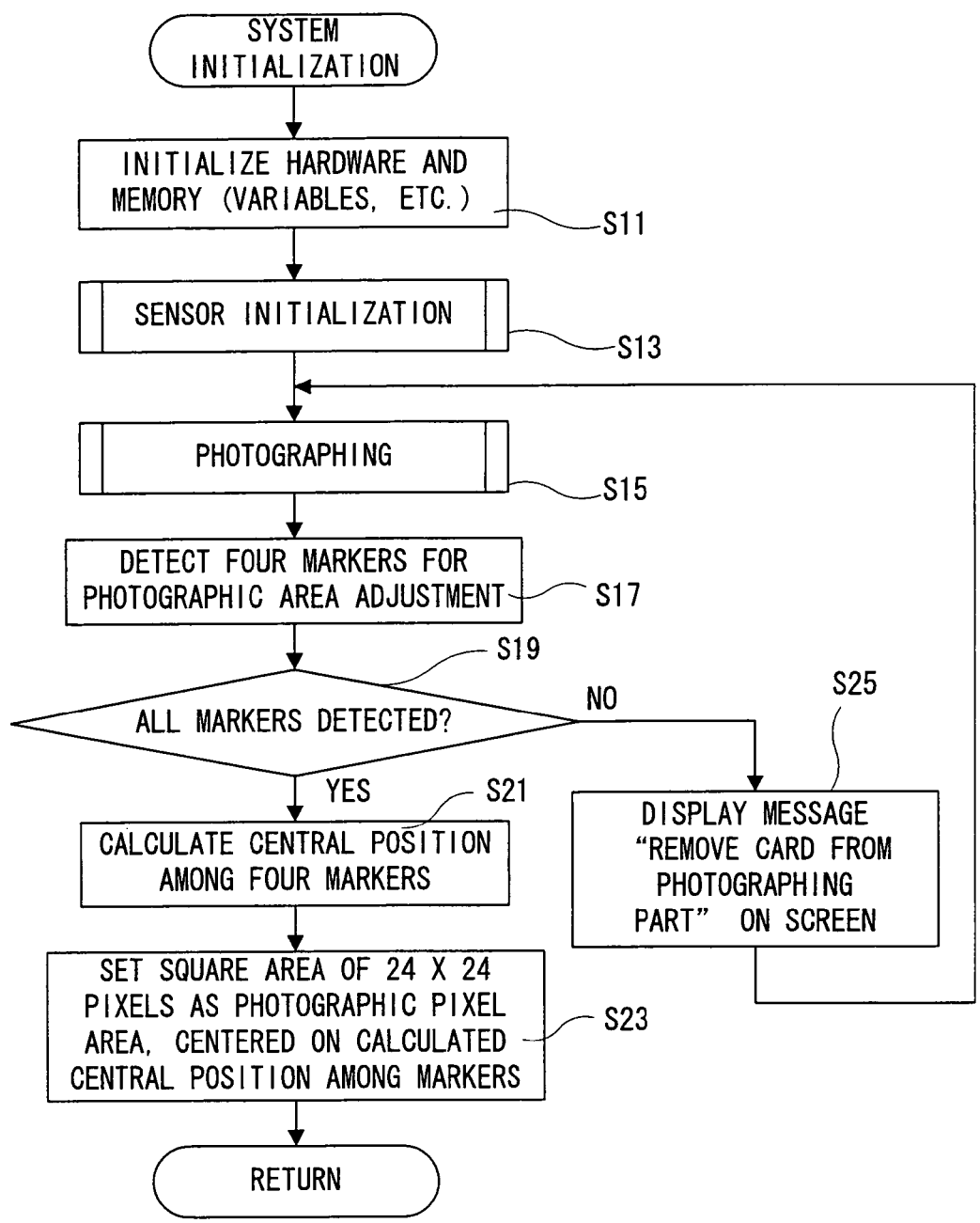
FIG. 13 is a flowchart showing a system initialization operation of FIG. 12 embodiment.
Figure 18:
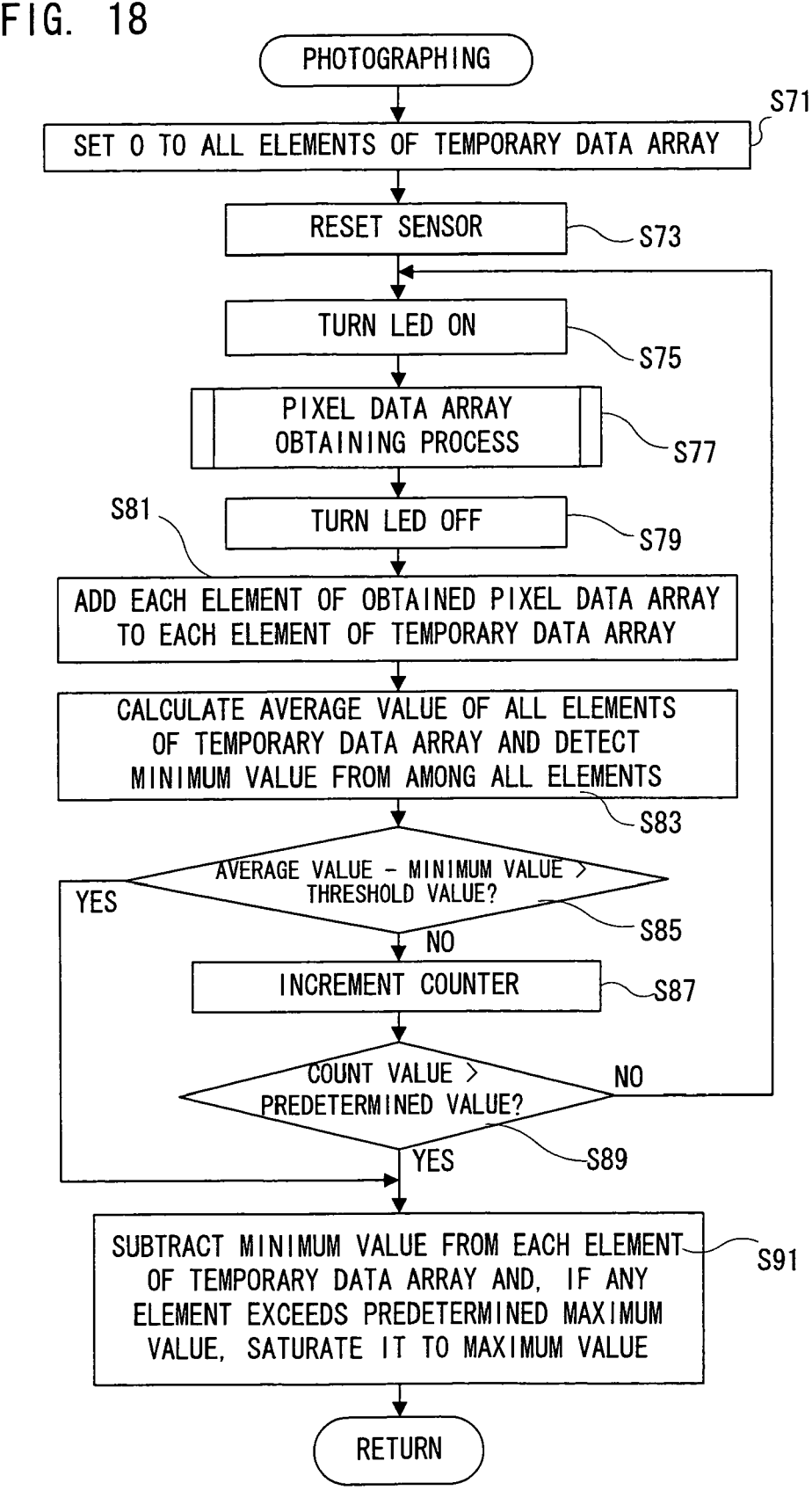
FIG. 18 is a flowchart showing a photographing operation in the system initialization process of FIG. 13 embodiment.

In a next step S15 of FIG. 13, a photographing routine is performed as shown in detail in FIG. 18. Referring to FIG. 18, "0" is set to all elements of a temporary data array (in a storage area of 32×32=1024 pixels) formed in an internal RAM (not illustrated) of the processor 64 in a first step S71. That is, the temporary data array is initialized. After that, the image sensor 54 is reset in a step S73 and the LEDs 58 are turned on in a step S75. Then, a picture element (pixel) data array fetching process is carried out in a next step S77.

Figure 19:
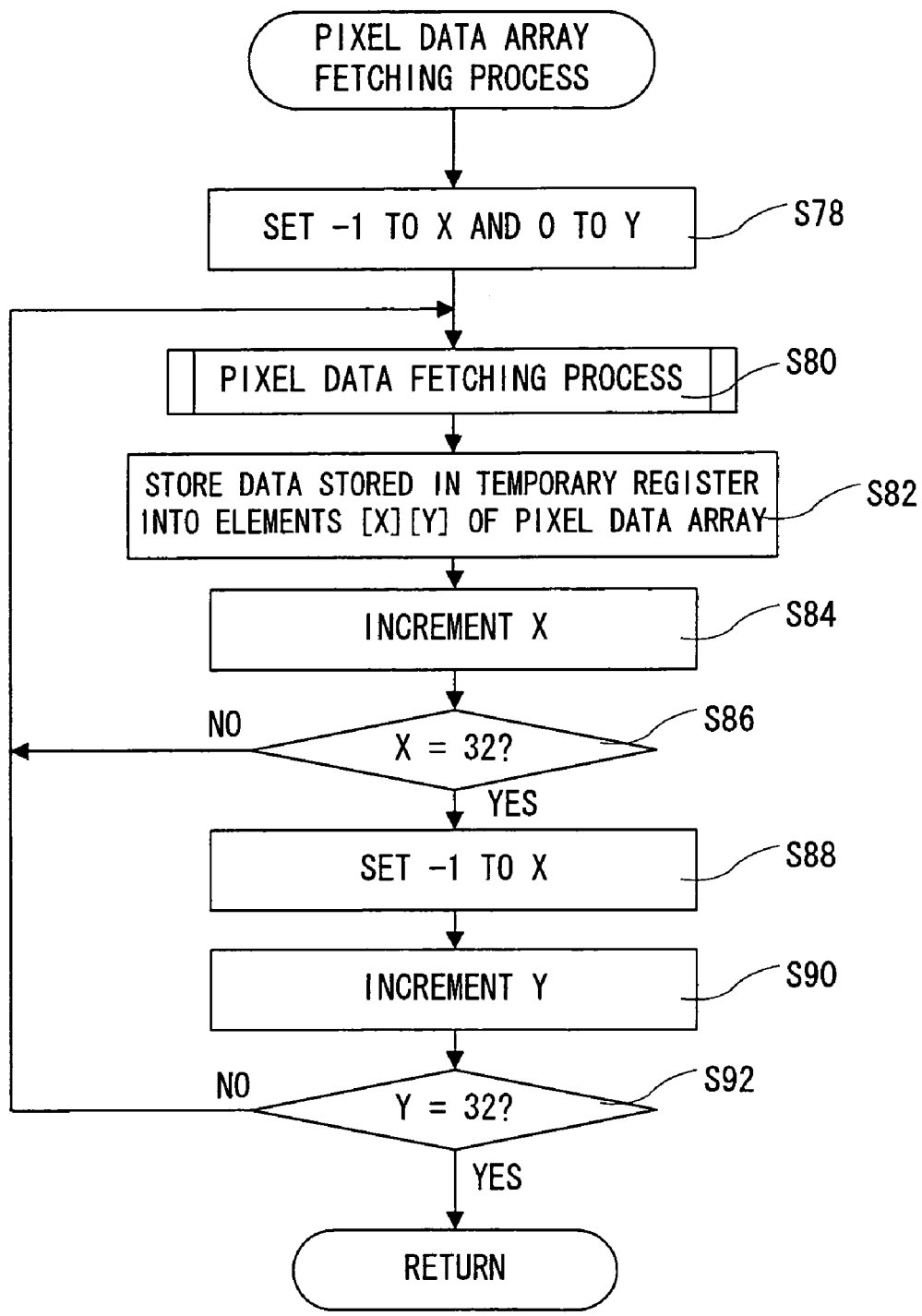
FIG. 19 is a flowchart showing a pixel data array acquisition processing operation in the photographing operation of FIG. 18 embodiment.

The pixel data array fetching process routine is specifically described in FIG. 19. In a first step S78 in FIG. 19, the game processor 64 sets "−1" to X and sets "0" to Y as an element number of the image data array. The pixel data array in this embodiment is two-dimensional array of X=0−31, and Y=0−31. However, the dummy data is output as data of a head pixel in each line as described above, so that "−1" is set as an initial value of X. In a succeeding step S80, a pixel data fetching process of the elements [Y] and [X] shown in FIG. 20 is executed.

Figure 20:
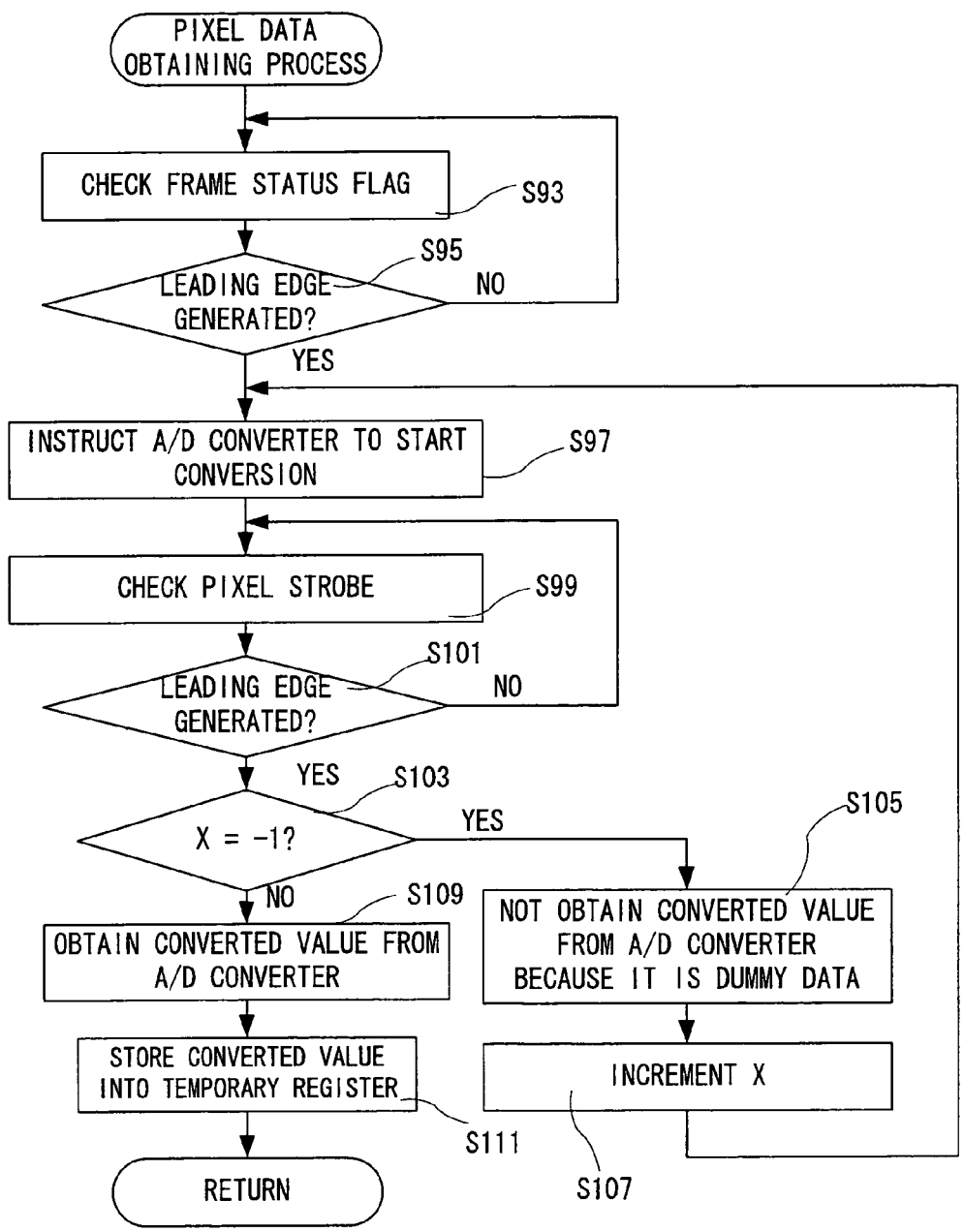
FIG. 20 is a flowchart showing a pixel data acquisition processing operation in the pixel data array acquisition processing operation of FIG. 19.

In a first step S93 shown in FIG. 20, the game processor 64 checks a frame status flag signal from the image sensor 54, and in a step S95, it is determined whether or not its rising edge (from the low level to the high level) occurs. Then, when it is detected that the flag signal rises in the step S95, the game processor 64 instructs the A/D converter inside thereof to start to convert an input analog pixel signal to digital data in a succeeding step S97. Then, in a step S99, it is determined whether or not the pixel strobe from the image sensor 54 is present, and in a step S101, it is determined whether or not its rising edge from the low level to the high level occurs.

If "YES" is determined in the step S101, the game processor 64 then determines whether X=−1 or not, that is, whether the head pixel or not in a step S103. As described above, the head pixel in each line is set as a dummy pixel, so that if "YES" is determined in the step S103, without fetching the pixel data at that time in a next step S105, the element number X is incremented in a step S107.

If "NO" is determined in the step S103, the second pixel data onward in the line is determined, and therefore, the pixel data at that time is fetched in steps S109 and S111 so as to be stored in a temporary register (not shown). Thereafter, the process returns to a step S82 shown in FIG. 19.

In the step S82, the pixel data stored in the temporary register is stored as the elements [Y] [X] of the pixel data array.

In a following step S84, the X is incremented. If it is determined in a step S86 that X is less than "32", the process from the step S80 to the step S84 described above is repeatedly executed. If it is determined in the step S86 that X has reached "32", that is, if the fetch of the pixel data has reached the end of the line, "−1" is set to the X in a following step S88 and the Y" is incremented in a step S90. If it has been determined in a step S92 whether Y is less than "32", the process returns to the step S80 to repeat the pixel data fetching process from the head pixel of the next line. If it is determined in the step S92 that Y has reached "32", that is, if the fetch of the pixel data obtainment has reached the end of the pixel data array, the process returns to a step S79 of FIG. 18.

The LEDs 58 are turned off in the step S79 of FIG. 18. After that, in a step S81, each element of the obtained pixel data is added to each element of the temporary data array. This process is a step to be executed so as to read even low-contrast photographic data in a secure manner, and a pixel value is added to each element (each pixel) of the temporary data array. Then, in a step S83, by determining a sum total of pixel values of all the elements of the temporary data array (32× 32=1024) and then dividing the sum total by the number of elements (1024 in this embodiment), an average pixel value of all elements of the temporary data array is calculated and a minimum pixel value is detected from all the elements.

In a succeeding step S85, it is determined whether or not "the average value−the minimum value" is larger than a predetermined threshold value. That is, it is determined whether or not a contrast has reached the predetermined threshold value or more. The threshold value here is a contrast (the average pixel value−the minimum pixel value) on a premise that image processing can be done without fault from that time onward. If "NO" has been determined in the step S85, that is, if the required minimum contrast has not been reached, a counter is incremented in a step S87 so as to repeat the steps S81 and S83, and then it is determined in a step S89 whether or not a count value of the counter has become larger than a predetermined value (32 times or 64 times in this embodiment). If "YES" is determined in the step S89, the contrast is not sufficient but a next step S91 is performed as in the case where "YES" is determined in the previous step S85 because the number of reading times of pixel data would become large and that would be too time-consuming. In this step S91, a minimum value is subtracted from each element of the temporary data array, and after the subtraction, some element(s) exceeding a predetermined maximum (pixel) value are saturated to the maximum value. More specifically, the values of all the elements are larger than the minimum value, and under these conditions, a dynamic range would be reduced due to a bias unnecessary for a direct current component. Thus, the process of subtracting the minimum value is performed. Then, a pixel value between the minimum value and the maximum value after the subtraction of the minimum value, is employed as it is. In this manner, the photographing process in the step S15 is carried out, and the photographic data (pixel value) with the contrast increased is stored in the temporary data array of the internal RAM (not illustrated).

Figure 21:
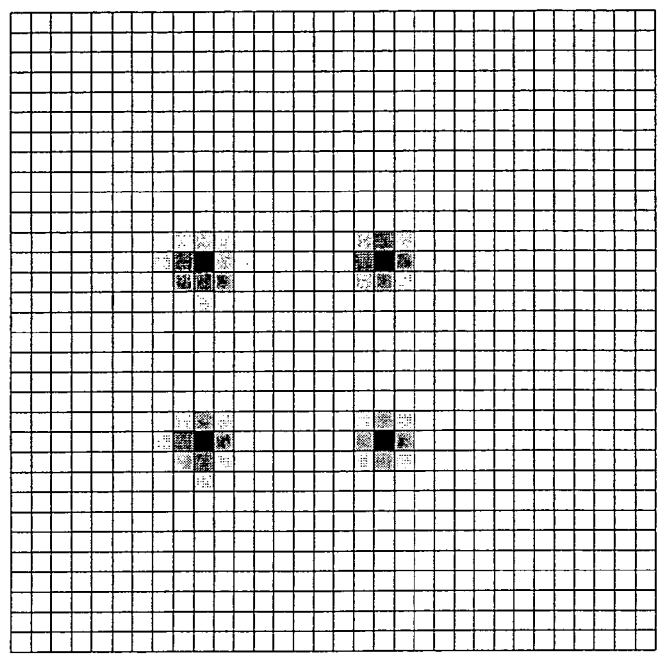
FIG. 21 is an illustrative view showing an image of a mark on the back side of a photographing part cover photographed by the photographing operation of FIG. 20.
Figure 22:
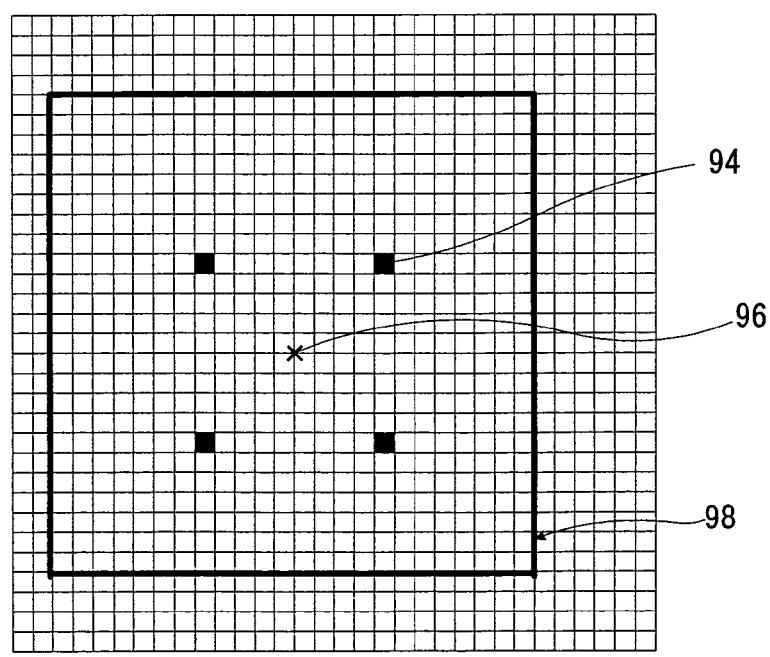
FIG. 22 is an illustrative view showing acquisition of a midpoint from the mark and establishment of an effective pixel area around the midpoint.

Then, returning to FIG. 13, the game processor 64 detects the four black marks 62 on the back side of the photographing part cover 26 based on the pixel value in a step S17 of FIG. 13. Then, in a step S19, it is determined whether or not all the four marks have been detected as shown in FIG. 21. If "YES" is determined in this step S19, this means that no card has been inserted into the card insertion slot 28 (FIG. 1 and FIG. 3) at that time and that therefore the back side of the cover 26 has been photographed as it is. Also, in this case, a pixel 94 located in the black mark 62 become blackest as shown in FIG. 22. In a succeeding step S21, the processor 64 determines a coordinate of a center 96 of a rectangular area defined by four pixels 94 shown in FIG. 22. Then, in a next step S23, a square area of 24×24 around the above mentioned central coordinate 96 is set as a photographic pixel area, i.e., an effective area 98.

As stated above, the effective pixel area 98 of 32×32 pixels to 24×24 pixels can be set in the system initialization process. Thus, even if there occurs any displacement from a position of the image sensor or another part due to an assembly error, for example, it is possible to correct or calibrate the displacement and to fetch a pixel value from the correct position at any time.

Additionally, although this embodiment does not provide for correction of a displacement related to a rotation direction, it is possible to make an angle correction as required. Still, in this embodiment, a certain degree of angle deviation can be compensated for by re-sampling the original 576 (24×24) pixels at a lowered resolution to form 64 re-sampled pixels (3×3), as described later.

Also, this embodiment uses the four marks to define the central position and the effective pixel area of predetermined pixels containing the central position. However, a minimum of two marks diagonally opposite to each other may allow the center and the effective area to be determined in the same manner.

Figure 12:
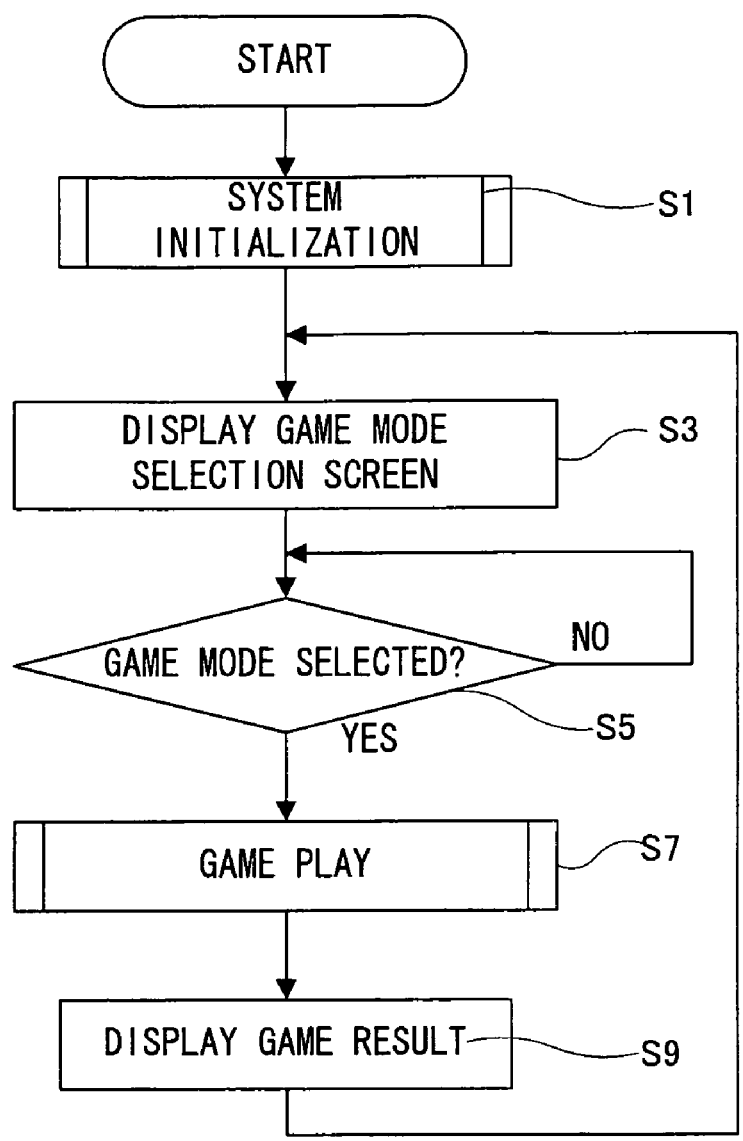
FIG. 12 is a flowchart showing an overall operation of FIG. 1 embodiment.

After the step S1 of FIG. 12, the game processor 64 displays in a step S2 a game mode selection screen on the television monitor 14 shown in FIG. 1. Then, the game processor 64 waits until some game mode is selected in the step S5. After that, the game play is executed in the selected game mode (in a step S7), and its result is displayed in the next step S9.

Figure 23:
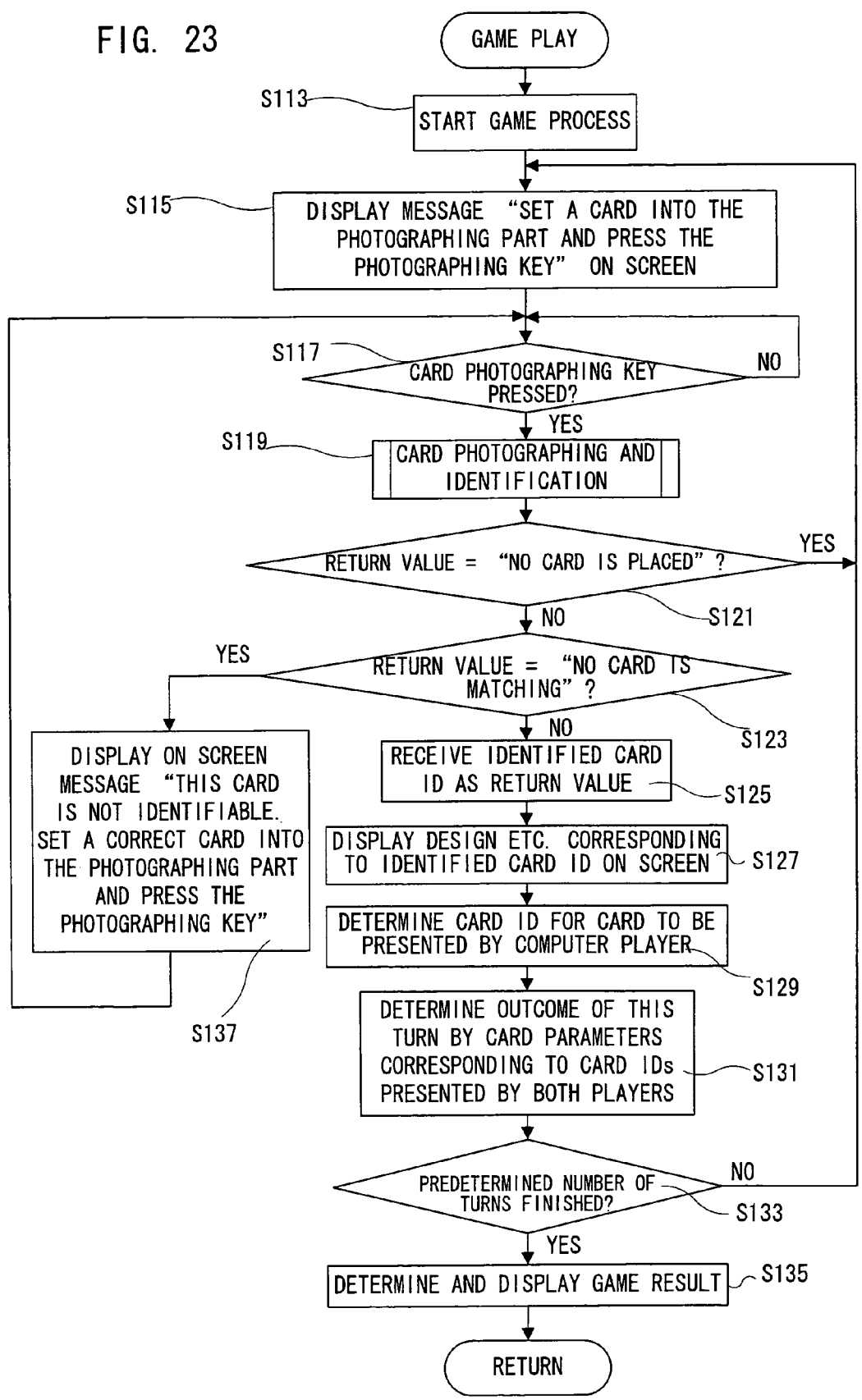
FIG. 23 is a flowchart showing a game play operation in FIG. 12 embodiment.
Figure 31:
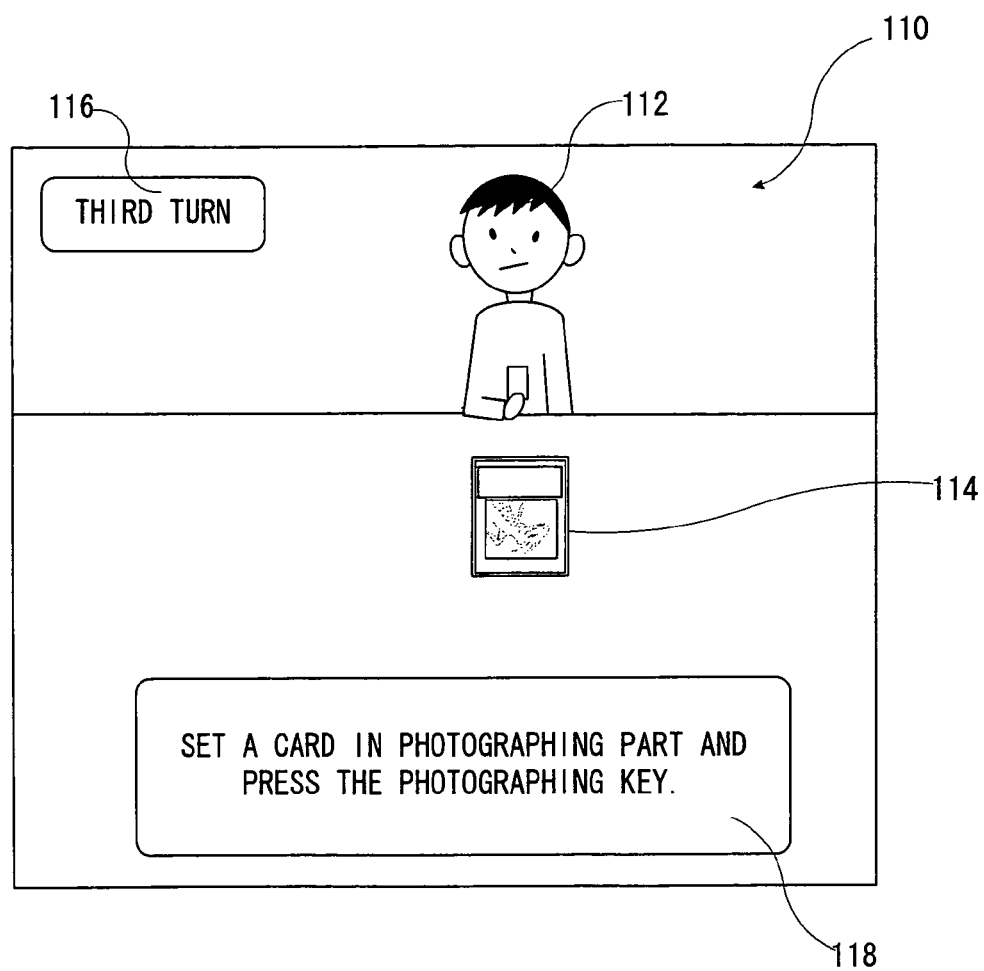
FIG. 31 is an illustrative view showing an example of a game screen displayed on the television monitor in FIG. 1 embodiment.

Returning to FIG. 12, a game play routine shown in the step S7 of FIG. 12 is described in detail in FIG. 23. In its first step S113, the game processor 64 starts a game process. Then, in a next step S115, a message "Set a card in the photographing part and press the photographing key." is displayed on the television monitor 14 as shown in FIG. 31, for example, so as to prompt a game player to insert a card into the card insertion slot 28 (FIG. 1). Then, when a press of the decision and photographing key 42 is detected in a step S117, a card photographing and identification routine is carried out in a next step S119.

Figure 24:
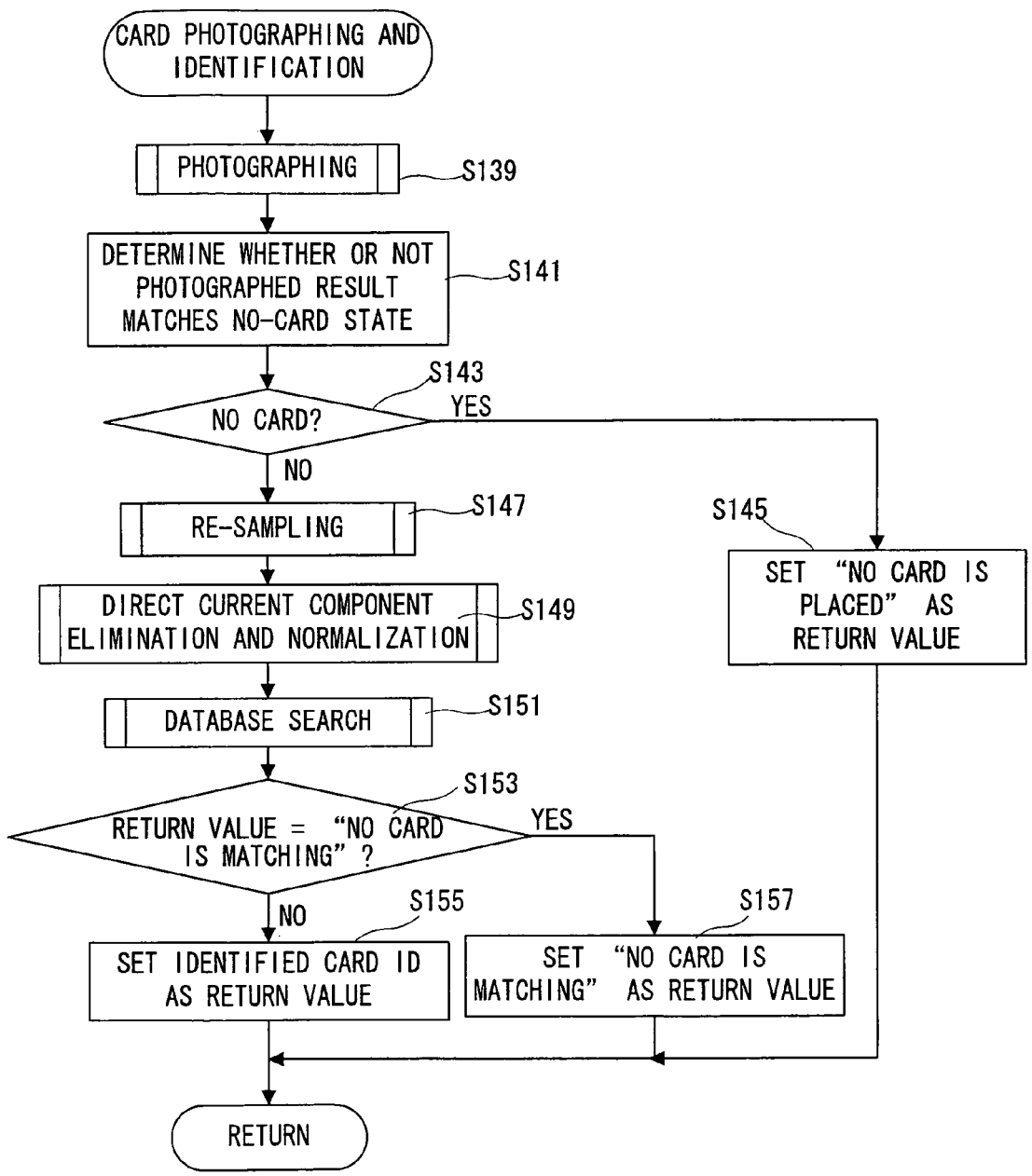
FIG. 24 is a flowchart showing a card photographing and identifying operation in FIG. 23 embodiment.

The card photographing and identification routine is described in detail in FIG. 24. In a first step S139 of the routine, the game processor 64 executes the above described photographing routine shown in FIG. 18. Thus, when the step S139 has been executed, all the elements (576 pixels) of the temporary data array store their own pixel values.

Under such conditions as noted above, the game processor 64 determines whether or not the photographed result matches a state of "No card exists". If "No card exists" i.e., "YES" is determined in a step S143, the game processor 64 sets a return value (a result returned from a subroutine to a process of invoking the subroutine) as "No card is placed" in a succeeding step S145.

If "NO" is determined in the step S143, re-sampling is carried out in a next step S147. The reason for carrying out re-sampling is to minimize the load on the processor 64 in performing an identification process and the size of the database 67A while assuring a required accuracy of identification. This re-sampling routine is described in detail in FIG. 25. As outlined above, in the re-sampling operation, the original 576 (24×24) pixels, i.e., P [0] [0] to P [23] [23] are converted into 64 re-sampled pixels Q [0] to Q [63]. In that case, a two-dimensional window function shown in FIG. 26 is used. The use of such a two-dimensional window function makes it possible not only to eliminate aliasing noises but also to absorb or compensate for card displacements.

The two-dimensional window function of this embodiment treats, out of the original nine pixels of 3×3, a value for a central pixel with a weight of "4", treats four pixels near the central one with a weight of "2", and treats four pixels at the corners most distant from the central one with a weight of "1". This aims to place emphasis on the pixels near the central by assigning more weights to the pixels closer to the central one of the original pixels forming the re-sampled pixels.

Figure 25:
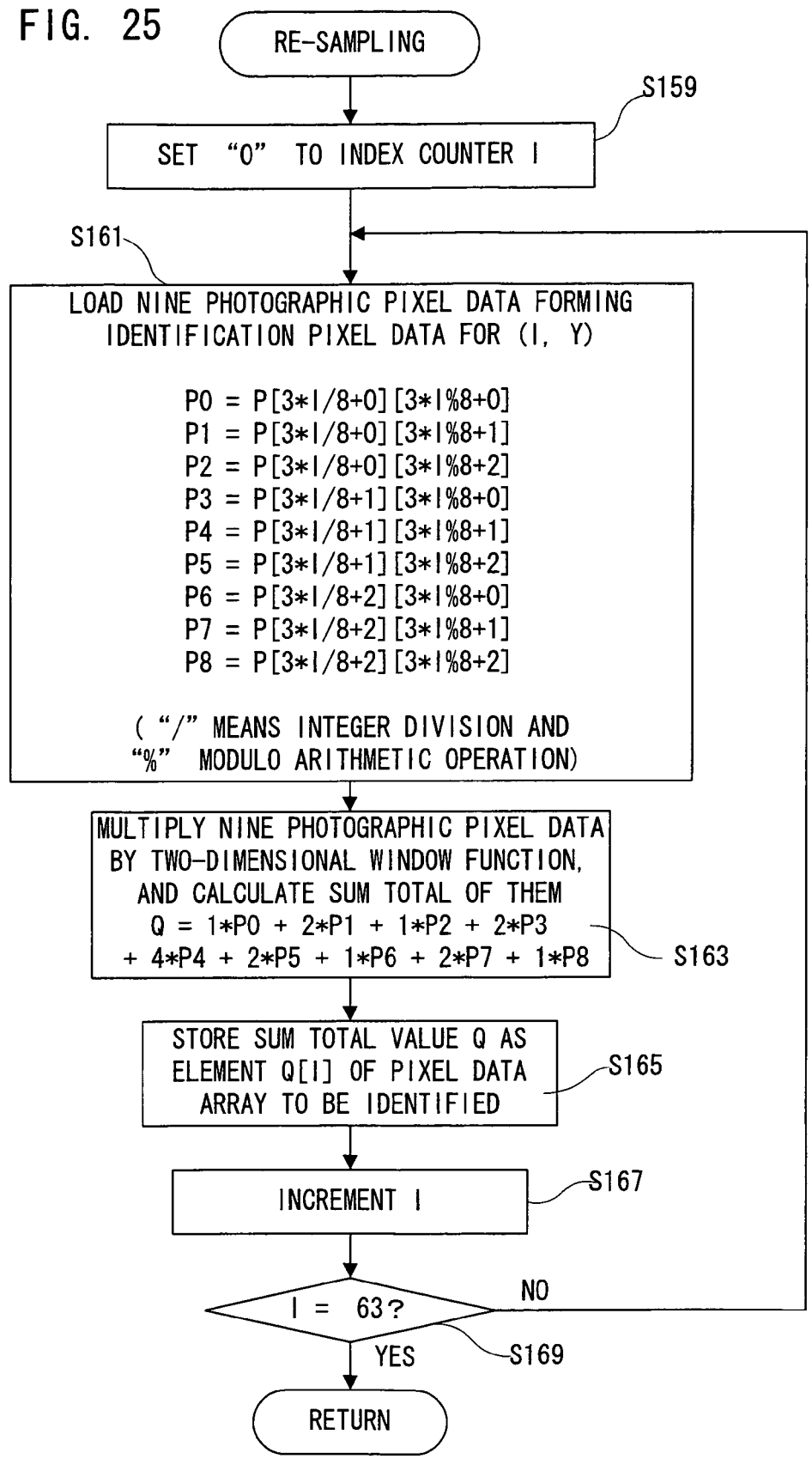
FIG. 25 is a flowchart showing a re-sampling operation in FIG. 24 embodiment.
Figure 26:
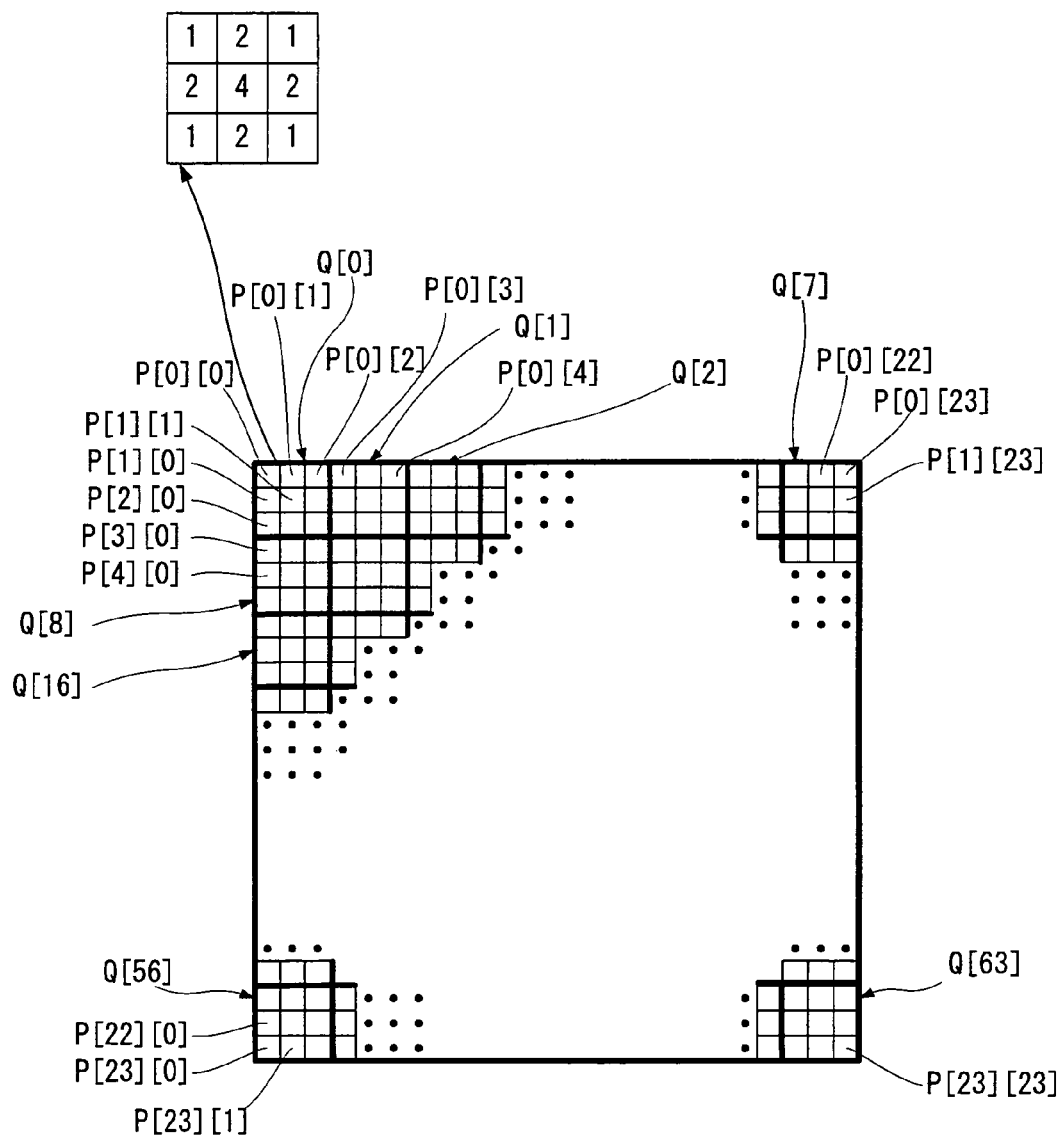
FIG. 26 is an illustrative view showing a sampling method in FIG. 25 embodiment.

For such a re-sampling operation, an initial value "0" is set to an index counter I (although not illustrated, this is formed in the internal RAM) in a first step S159 of FIG. 25.

After that, in a step S161, nine pixels corresponding to Q [I] are loaded and stored in their individual local variables of P0 to P8.

Here, P0 denotes the leftmost pixel in the upper row out of the nine pixels shown in FIG. 26. The remaining pixels are allocated in sequence in such a manner that the pixels on the right of the upper leftmost one are P1 and P2, the leftmost pixel in the middle row is P3, the central pixel is P4, the pixel on the right of the central one is P5, and the pixels in the lower row are P6, P7 and P8 from left to right. Incidentally, integer division and modulo arithmetic operation are used in a step S161 because the re-sampled pixels Q [0] to Q [63] need to be loaded into a one-dimensional register, whereas the temporary data array stores each pixel value in a two-dimensional configuration. In this way, each original pixel value is read out from the memory in the step S161.

In a succeeding step S163, the processor 64 calculates the sum total of the original nine pixel values according to assignment of the weights in the two-dimensional window function described above. More specifically, the pixels P0, P2, P6 and P8 are multiplied by "1", P1, P3, P5 and P7 are multiplied by "2", P4 is multiplied by "4", and then the inclusive sum Q of these values are calculated. Then, in a step S165, the sum total Q is stored as determination pixel data for Q [I] in the re-sampled pixel array (FIG. 26). The steps S161 to S165 are repeatedly executed until the index I is incremented in a next step S167 and "YES" is determined, that is, it is detected that the index I has reached "63" in a step S169. Consequently, the pixel data to be identified, i.e., the re-sampled pixel values for all the 64 re-sampled pixels Q [0] to Q [63] are stored in the memory.

Figure 27:
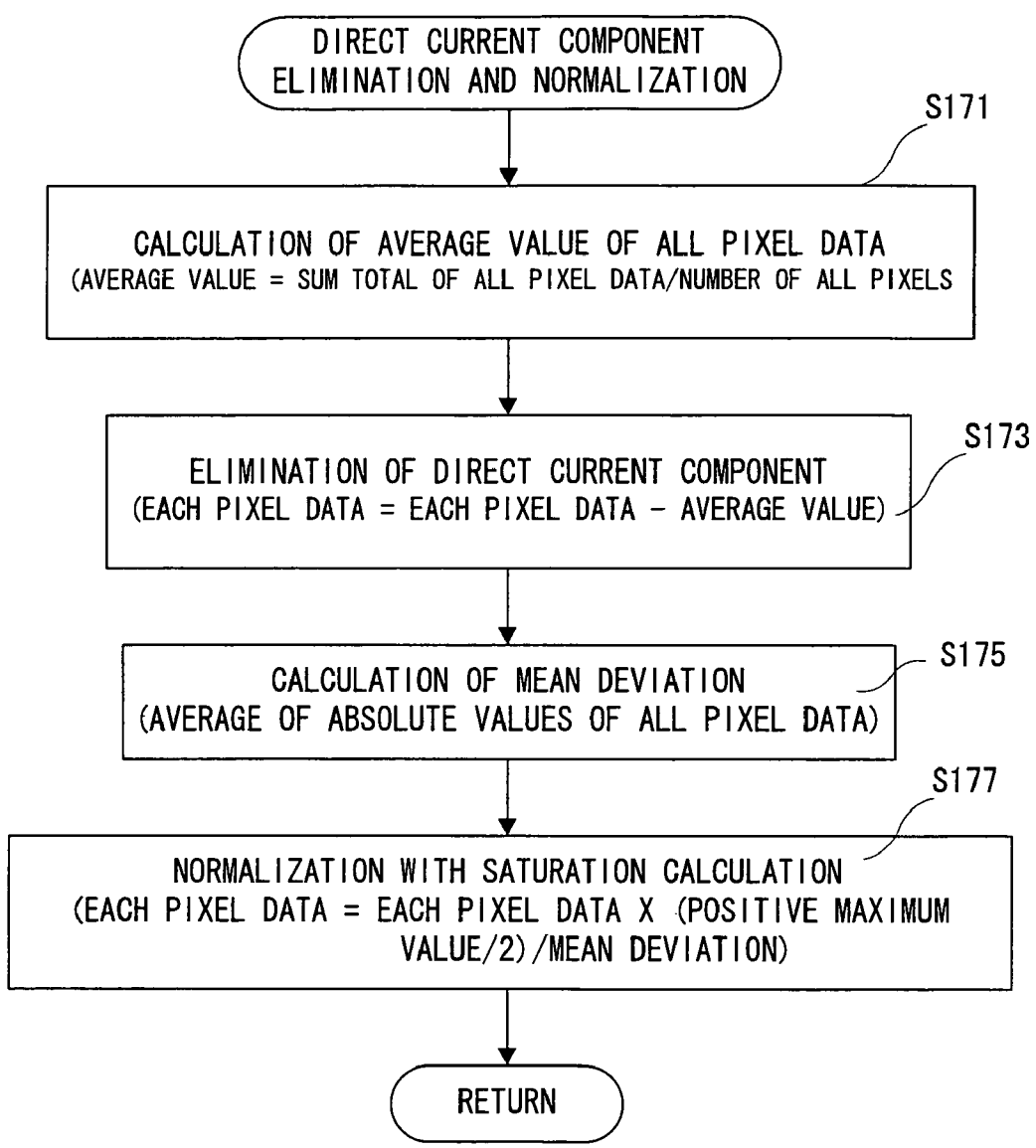
FIG. 27 is a flowchart showing a direct current component elimination and normalization operation in FIG. 24 embodiment.

After the re-sampling process in the step S147 (FIG. 24) has been carried out in this manner, a direct current component elimination and normalization process is performed in a next step S149 according to the subroutine in FIG. 27. This direct current component elimination and normalization process is performed with the aim of increasing the identification accuracy because there are differences in brightness level and contrast in the entire design from card to card, and it eliminates a direct current component from the pixel data array to be identified (re-sampled pixel values) for normalization.

More specifically, an average value of all the pixel data (re-sampled pixel values here) is calculated in a step S171 of FIG. 27, and the elimination of the direct current component is performed in a step S173. That is, each re-sampled pixel value is calculated again as "re-sampled pixel value−average value". Next, a mean deviation is determined by calculating an average of absolute values of all the re-sampled pixel values in a step S175. After that, saturation calculation ({re-sampled pixel value×positive maximum value/2}÷mean deviation) is performed in a step S177, which normalizes each re-sampled pixel value in which the direct current component has been eliminated.

At a stage where the step S149 of FIG. 24 is completed in this manner, the internal RAM stores 64 re-sampled pixel values for design determination. Under these conditions, it is determined in a succeeding step S151 which card has been photographed at that time, referring to or searching the database 67A shown in FIG. 7 (and the database 67B shown in FIG. 8). In this step S151, in order to determine a similarity between the pixel data array to be identified (re-sampled pixel values) and the pixel data array for comparison (the database 67A), Euclidean distance, for example, is used to identify a card ID in the pixel data array for comparison with the shortest distance, as a card ID for the card photographed at that time. The subroutine for database search is more specifically described in FIG. 28 and FIG. 29.

Figure 28:
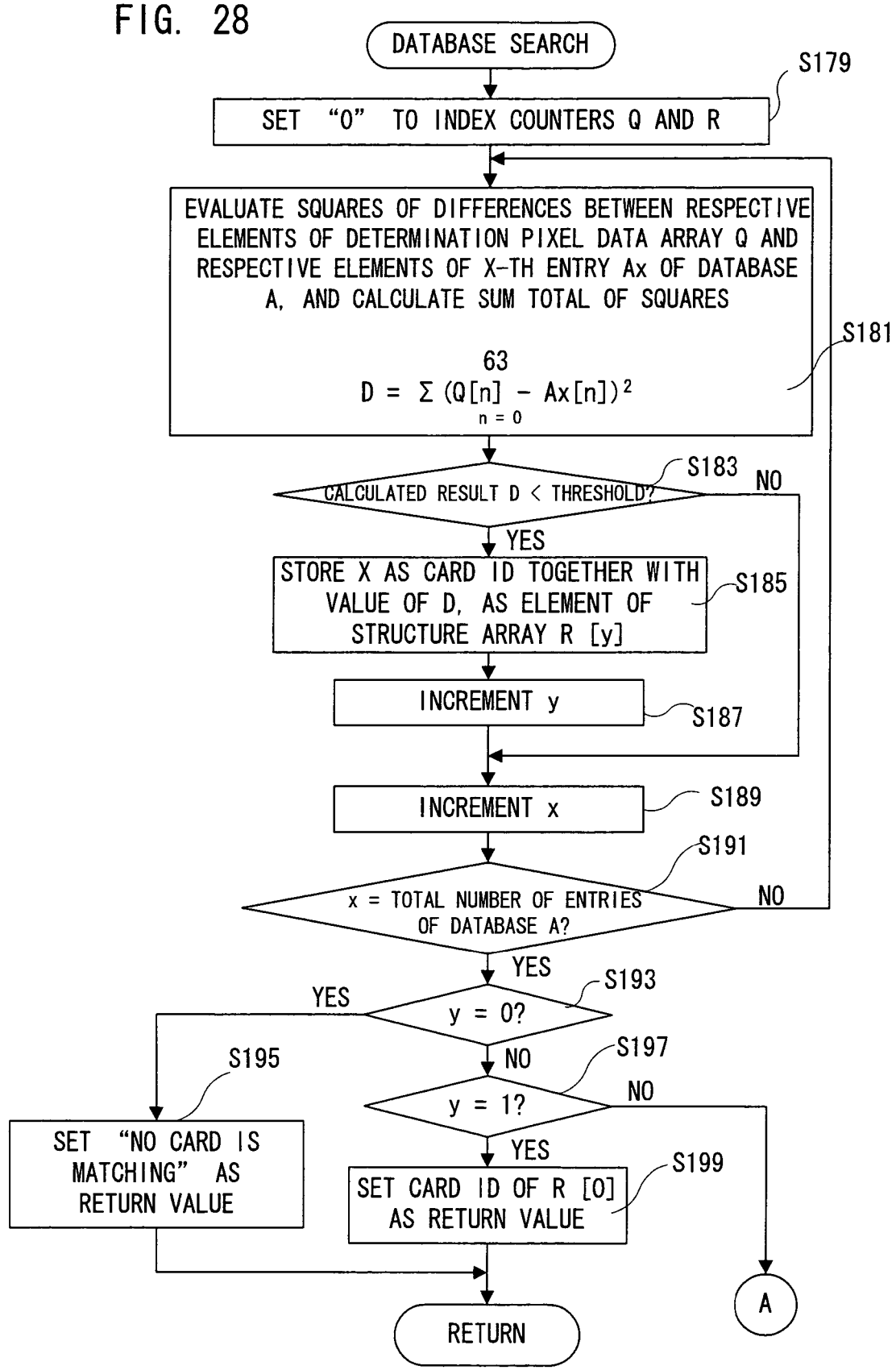
FIG. 28 is a flowchart showing a database search operation in FIG. 24 embodiment.

In a first step S179 of FIG. 28, "0" is set to index counters x and y. The index x is an index showing an entry number in the database 67A shown in FIG. 7. The index y is an index showing the number of identification candidates.

In a next step S181, the processor 64 evaluates squares of differences between respective elements of the pixel data array Q to be identified (re-sampled pixel values) and respective elements of an x-th entry Ax in the database 67A of FIG. 7, and calculates a sum total of the squares. More specifically, this embodiment employs, as an algorithm for matching detection, a method by which differences between all the elements of the identification pixel data array, i.e. the re-sampled pixel values and all the elements of the entry are calculated with respect to all the entries preset in the database (entries #0 to #127: FIG. 7 in this embodiment) and the entry with the smallest sum total of differences is identified as a matching card ID (identification number). In this embodiment, however, a sum total D of the squares of differences is calculated so as to emphasize differences among the elements for easy identification. Thus, it may be possible to determine either the sum total of absolute values of differences or the sum total of the squares of differences.

In addition, the sum total D determined in this step S181 is included in the concept of "distance" for determining a similarity between multi-dimensional data arrays and, more specifically, this corresponds to Euclidean distance. For such a distance, Hamming distance, etc. may be utilized besides Euclidean distance.

In a succeeding step S183, the processor 64 determines whether or not the sum total D determined in the step S181 is smaller than a predetermined threshold value. This step is performed so as not to save the sum total D as a candidate if it exceeds the predetermined value because a difference from the reference value in the database would become too large.

If "YES" is determined in the step S183, the sum total D is smaller than the threshold value and thus the above mentioned x as a card ID is stored in the memory together with the value of the sum total D, which are elements of a structure array R [y]. Then, the number of candidates y is incremented in a step S187, and also the entry number x is incremented in a step S189 in order to carry out entries into the database 67A. In a step S191, it is determined whether or not the entry number x has reached the total number of entries ("128" in this embodiment) in the database 67A. If "NO", the steps S181 to S189 are repeatedly executed. Then, when the process for all the elements (re-sampled pixel values) of the determination pixel data has been completed, "YES" is determined in a step 191, and the process goes on to a succeeding step S193.

In the step S193, the processor 64 determines whether or not the number of identification candidates y is "0". If "YES" is determined in the step S193, the sum total D exceeds the threshold value for all the entries. In this case, a return value "No card is matching" is established in a next step S195, and the process is returned to a step S153 of FIG. 24.

If "NO" is obtained in the step S193, it is determined whether or not the number of candidates y is "1" in a next step S197. The existence of only one candidate means that the card to be identified is none other than that candidate. In that case, therefore, the card ID for the candidate structure R [0] is set as a return value in a next step S199, and the process is returned to the step S153 (FIG. 24).

If "NO" is determined in the previous step S197, the number of identification candidates y is "2" or more, that is, a plurality of identification candidates are left. In this case, the candidates need to be narrowed down into one. After that, the process thus moves on to the process of the flowchart in FIG. 29.

Figure 29:
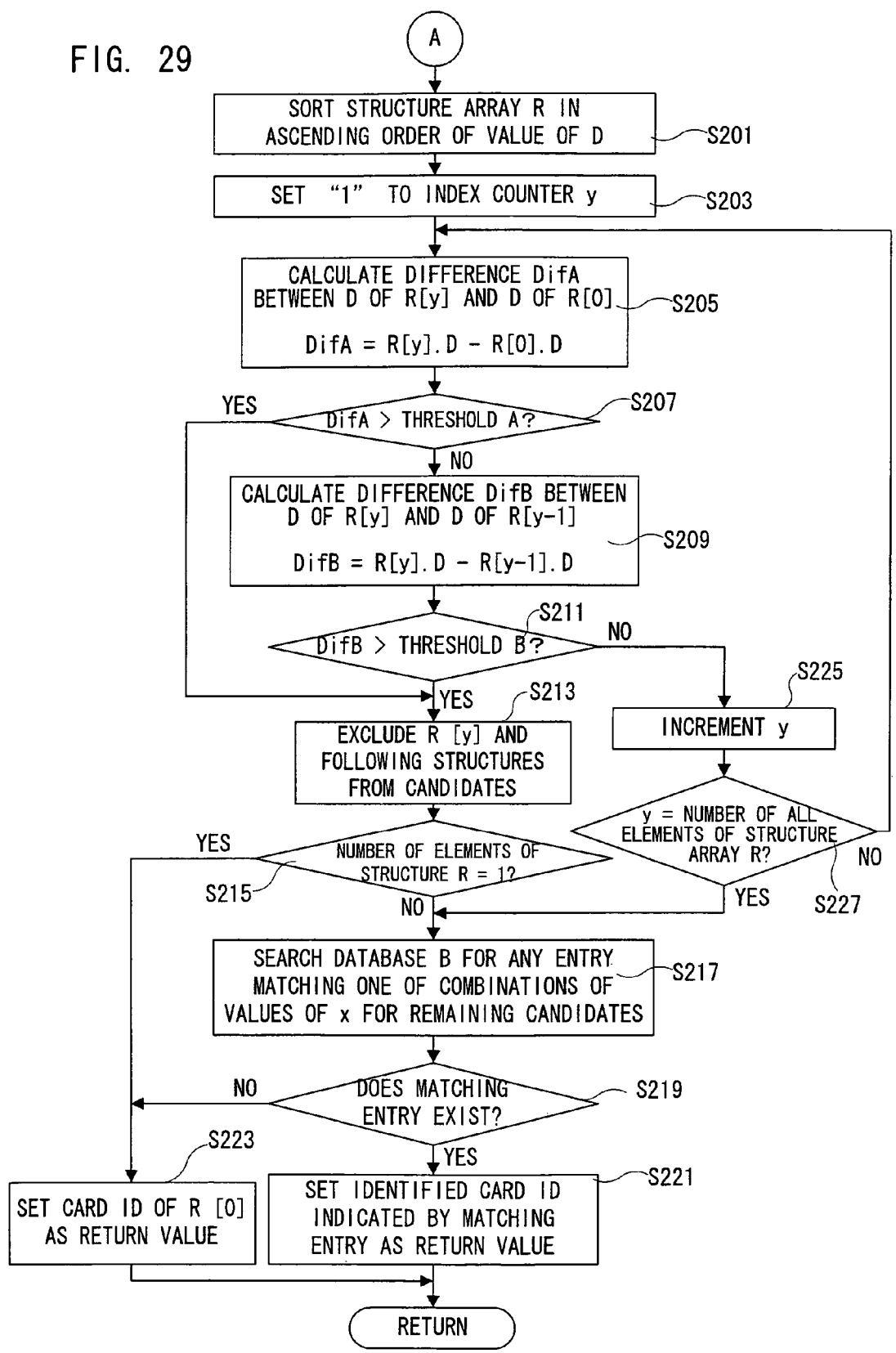
FIG. 29 is a flowchart showing rest of the database search operation.

In a step S201 of FIG. 29, the processor 64 sorts y candidates R for identification in ascending order of the sum total D calculated in the step S181 (FIG. 28), and sets "1" to the index counter y in a next step S203. More specifically, out of the identification candidates R arranged in ascending order of the sum total D, the candidate with the second smallest D is designated. The candidate with the smallest D is R [0].

Then, in a step S205, the processor 64 calculates a difference Dif A in D between the candidate R [1] at that time and the candidate R [0] with the smallest D. That is, the Dif A between each candidate R [y] and the smallest candidate R [0] is figured out in the step S205. Then, in a step S207, it is determined whether or not the difference Dif A is larger than a predetermined threshold value A. In other words, it is determined whether or not the degree of similarity between the candidate structure R [0] with the smallest D and the candidate structure R [y] at that time is larger than the threshold value A, that is, whether or not it is meaningful to save the candidate structure R [y] as a candidate.

If "NO" is determined in the step S207, that is, if it is determined that the candidate R[y] should be saved as a candidate, then a difference Dif B in D between adjacent ones of the candidate structures that have been sorted in ascending order of D in the step S201, is calculated in a succeeding step S209. That is, the D of an immediately preceding candidate R [y−1] is subtracted from the D of each candidate R [y]. Then, it is determined in a step S211 whether or not the difference Dif B is larger than a predetermined threshold value B. More specifically, it is determined whether or not the degree of similarity between the adjacent ones of the candidates sorted in increasing order of D is larger than the threshold value B, that is, whether or not it is meaningful to save the candidate structure R [y] as a candidate.

If "YES" is determined in the step S207 or the step S211, as stated above, it is not meaningful to save the candidate structure R [y] as a candidate, and thus the structure R [y] and later ones are excluded from the identification candidates in a next step S213.

Then, it is determined in a step S215 whether or not only one candidate structure R is left as a consequence. If "NO" is determined in the step S215, there left a plurality of candidate structures. In that case, the database 67B of FIG. 8 is referred to and searched for any entry matching one of combinations of card IDs of the left candidates in a step S217. That is, it is determined in the step S217 whether or not the two (2) or more left candidates R match any one entry in the database 67B. The database 67B, as described above, lists in sequence the combinations of card IDs which are left as identification candidates. Then, in the step S217, it is determined whether or not there is any one of the combinations of card IDs for the left plurality of candidates that matches any one of combination patterns of card IDs listed in the database 67B. Next, it is determined in a step S219 whether or not there is any entry with a matching design.

If "YES" is determined in the step S219, a card identification number (ID) indicated by the entry having the matching design is established as a return value, and the process returns to the step S153 of FIG. 24.

If "NO" is determined in the step S219, as in case where "NO" is determined in the previous step S215, the card ID of the candidate R [0] with the smallest D at a top of the sequence sorted in the step S201, is established as a return value in a step S223, and the process returns to the step S153 of FIG. 24.

If "NO" is determined in the step S211, that is, if the difference Dif A in D between each structure and the structure R [0] with the smallest D is smaller than the threshold value A and also the difference Dif B between adjacent ones of the sorted structures is smaller than the threshold value B, the index y is incremented so as to designate the next (the third or later) structure in a step S225. Then, it is determined in a next step S227 whether or not all the structures have been processed. Accordingly, if "NO" in the step S227, the process returns to the step S205 to repeatedly perform the steps S205 to S211. If "YES" in the step S227, the process moves on to the step S217.

In this way, by searching the database 67A (and the database 67B) in the step S151 of FIG. 24, a return value is returned as a search result from one of the steps S195, S199 (both are shown in FIG. 28), S221 and S223 (both are shown in FIG. 29). Then, the game processor 64 determines in the step S153 whether or not the return value is "No card is matching", that is, whether or not there is any return value with ID from the step S195. If "NO", the card ID of the entry identified in the step S199, S221 or S223 is established as a return value, and the process is returned to the game play routine (a step S121 of FIG. 23). If "YES", a return value "No card is matching" is established, and the process is returned to the step S121.

Returning to FIG. 23, it is determined in the step S121 whether or not the return value from the previous step S119 is "No card is placed". If "YES", the process returns to the previous step S115. If "NO", the process moves to a next step S123 so as to determine whether or not the return value is "No card is matching". If "YES" is determined in the step S123, a message "This card is not identifiable. Set a correct card into the photographing part and press the photographing key." is displayed on the television monitor 14 so as to request the game player for card replacement.

Figure 30:
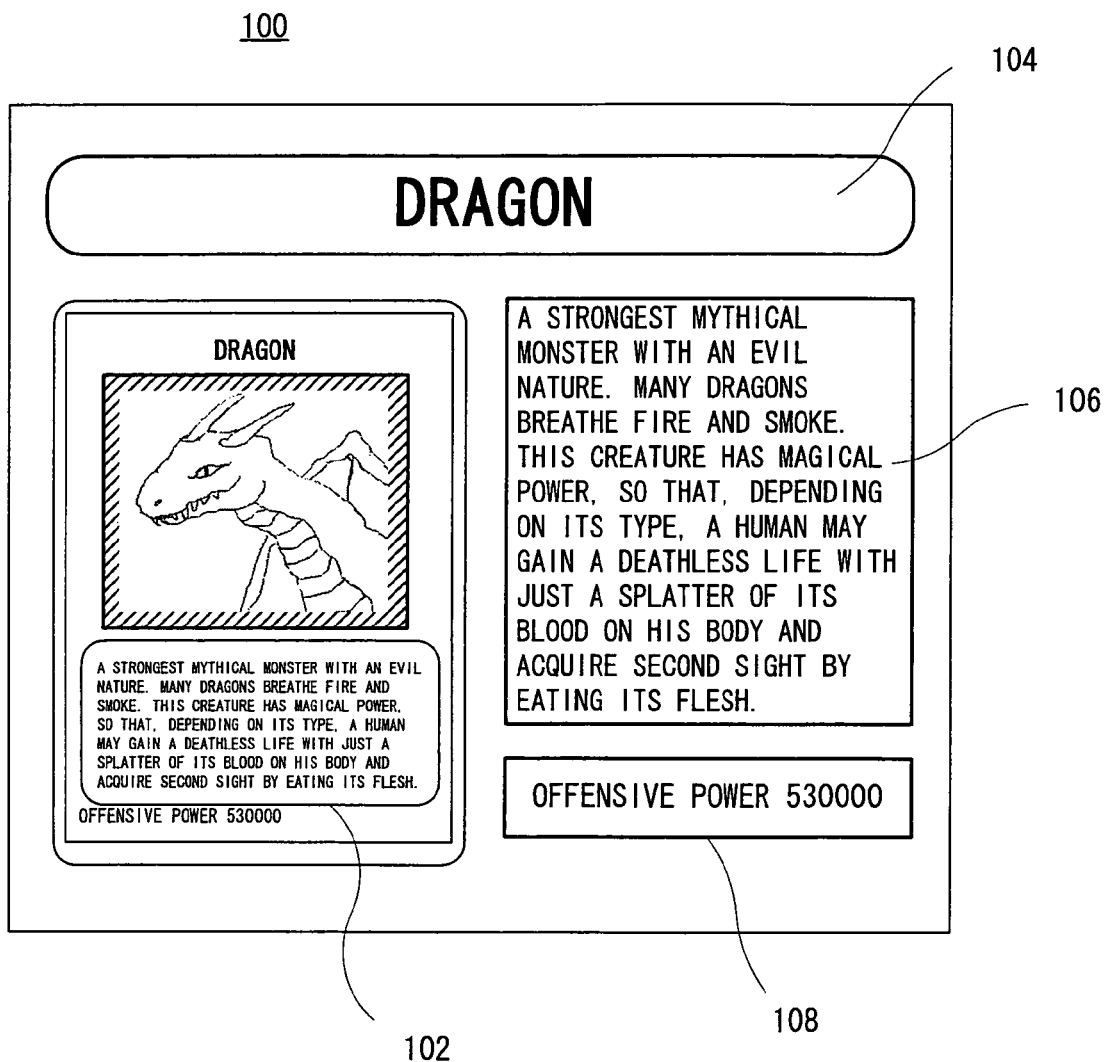
FIG. 30 is an illustrative view showing an example of a card display screen displayed on a television monitor in FIG. 1 embodiment.

Then, if "NO" is determined in the step S123, the processor 64 receives in a next step S125 the card ID indicated by the return value in each case. After that, in a step S127, the processor 64 displays a card display screen 100 indicated by the card ID on the television monitor 14 as shown in FIG. 30. The display screen 100 here includes a design portion 102, and the design portion 102 displays a same design as the design 31 of the card 30 (FIG. 2). This allows the game player to know that the card he inserted into the card insertion slot 28 at that time is properly recognized. The card screen 100 further includes a name portion 104, and the name portion 104 displays a name expressing the design shown on the design portion 102, "Dragon" in this embodiment. A descriptive text 106 contained in the card screen 100 is presented in a form of text introducing characteristics of an object (character) expressed by the design and designated by the name. Also, a power display portion 108 indicates offensive and defensive powers of the object designated by the name, Offensive power 530000 in the case of this embodiment.

In this way, after the card screen 100 is displayed corresponding to the identified card, in a step S129 the game processor 64 acts as a computer player and decides a card ID of the card to be presented for playing a match. In a step S131, an outcome of the turn is determined from the cards presented by the both players, i.e., the real game player and the computer player. When detecting the end of the turn in a step S133, the computer player displays a game screen 110 on the television monitor in a step S135 as shown in FIG. 31. Displayed on the game screen 110 are a player character 112 showing the computer player played by the game processor and a card character 114 showing the card presented by the computer player. Meanwhile, a turn display portion 116 shows the current turn, and a message display portion 118 displays a message prompting the game player to insert a card, such as "Set a card into the photographing part and press the photographing key".

Also, as a matter of course, the card game itself may be changed as required (in game rules, card designs, etc.), and according to that, the game screen 110 and the card screen 100 may be altered as required.

In addition, the above embodiments are described, taking as an example a card game system on which cards are identified and a match game is played with inputs according to the identification results. However, it is needless to say that card identification according to the present invention may be applied to amusement (entertainment) systems other than card game, such as karaoke.

Moreover, in the above described embodiments, the comparison data array stored in the database is searched for a completely matching or close-to-matching entry based on a pixel data array generated by photographing and processing a card design through re-sampling operation or the like, and the card ID of that entry is obtained as output. However, it may be also possible to acquire character string data by subjecting a pixel data array fetched from photographing operation or a data array after re-sampling to such a process as generally well-known character recognition.

Furthermore, it may be also possible to simultaneously obtain a card ID and character string data by combining the card identification process and the character recognizing process in the above described embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An entertainment apparatus using cards for obtaining inputs from a plurality of cards on each of which a visually human-identifiable design is printed and performing information processing in accordance with the inputs, comprising:
   a card photographing part, the card defining a footprint having a first dimension and a second dimension perpendicular to the first dimension, the card photographing part including an area having a dimension equal to the first dimension, a first structure opposing a first side of the area, a second structure opposing a second side of the area, the second side being opposite the first side, the first and second structures acting to fix the card in contact with the area;
   a photographic device that is configured to photograph the design of the card that is fixed in contact with the area of the card photographing part and to form a photographic pixel data array;
   a database including a plurality of entries individually corresponding to the plurality of cards, each of the entries including a pair of a card ID and a comparison data array;
   a card identifier for searching the database for a specific comparison data array based on the photographic pixel data array and obtaining a card ID pairing up with the specific comparison data array; and
   an information processor for performing the information processing with the card ID obtained by the card identifier as an input,
   wherein the photographic device includes an image sensor for photographing the design and outputting a photographic signal, a data array former for sampling the photographic signal and forming a data array, and a photographic pixel data array former for re-sampling the data array and forming the photographic pixel data array,
   wherein the data array formed by the data array former is constituted by a plurality of pixel data,
   wherein the photographic pixel data array formed by the photographic pixel data array former is constituted by a plurality of photographic pixel data, and
   wherein the photographic pixel data array former sequentially extracts a predetermined number of pixel data of pixels adjacent to each other in an image represented by the photographic signal from the plurality of pixel data constituting the data array while the extracted pixel data are changed sequentially, and produces a single photographic pixel data based upon the extracted predetermined number of pixel data every time the predetermined number of pixel data is extracted.

2. An entertainment apparatus as set forth in claim 1, wherein the data array former samples the photographic signal at a first resolution, and the photographic pixel data array former re-samples the data array at a second resolution which is lower than the first resolution, and the comparison data array includes comparison data corresponding to the second resolution.

3. An entertainment apparatus as set forth in claim 1, wherein the database includes card data corresponding to each entry and the information processor includes a card data displayer for displaying the design based on the card data of the entry corresponding to the card ID obtained by the card identifier.

4. An entertainment apparatus as set forth in claim 1, further comprising a cartridge connector, wherein the cartridge connector is equipped with a memory cartridge and the memory cartridge stores another database.

5. An entertainment apparatus as set forth in claim 1, further comprising:
   a light source for indirectly irradiating light to a surface to be photographed of the card fixed in contact with the area of the card photographing part.

6. An entertainment apparatus as set forth in claim 1 wherein the first and second structures constitute walls of a card insertion slot.

7. An entertainment apparatus as set forth in claim 2, wherein the card identifier calculates a distance between the photographic pixel data array and the comparison data array, and obtains the card ID of the entry with the comparison data array at the shortest distance.

8. An entertainment apparatus as set forth in claim 2, wherein the photographic pixel data array former produces the single photographic pixel data by calculating a sum of the predetermined number of pixel data while a predetermined weight to the predetermined number of pixel data is assigned.

9. An entertainment apparatus as set forth in claim 2, wherein the card identifier includes a threshold value determiner for determining whether or not the sum total of differentials is larger than a predetermined threshold value; and excludes any entry with the sum total of differentials larger than the predetermined threshold value from identification candidates.

10. An entertainment apparatus as set forth in claim 7, wherein the distance is a sum total of absolute values of differentials between respective elements of the photographic pixel data array and corresponding elements of the comparison data array.

11. An entertainment apparatus as set forth in claim 7; wherein the distance is a sum total of squares of differentials between the respective elements of the photographic pixel data array and the corresponding elements of the comparison data array.

12. An entertainment apparatus as set forth in claim 9; wherein the card identifier includes a number-of-candidates determiner for determining a total number of candidates which are left as a result of determination by the threshold value determiner, and does not obtain any card ID when it is determined by the number-of-candidates determiner that the number of candidates is "0", and obtains the card ID of the identification candidate when it is determined that the number of candidates is "1".

13. An entertainment apparatus as set forth in claim 12, taking the database as a first database, and further comprising a second database including one or more entries, each of the entries including a plurality of candidate card IDs and one determination card ID, wherein the card identifier includes a number-of-candidates determiner for determining whether two or more the identification candidates are left or not, searches the second database for an entry in which there is a match between a combination of card IDs of the left candidates and a combination of the candidate card IDs in the second database when it is determined by the number-of-candidates determiner that the number of candidates is "two or more" and, if there exists any matching entry, obtains the determination card ID of the entry, obtains the determination card ID of the entry.

14. An entertainment apparatus using cards, which obtains inputs from a plurality of cards on each of which a visually human-identifiable design is printed and performs information processing according to the inputs, comprising:

a card photographing part, the card defining a footprint having a first dimension and a second dimension perpendicular to the first dimension, the card photographing part including an area having a dimension equal to the first dimension, a first structure opposing a first side of the area, a second structure opposing a second side of the area, the second side being opposite the first side, the first and second structures acting to fix the card in contact with the area;

a photographic device that is configured to photograph the design of the card that is fixed in contact with the area of the card photographing part and to form a photographic pixel data array;

a card identifier for obtaining a data string corresponding to the design from the photographic pixel data array; and an information processor for performing the information processing with the data string obtained by the card identifier as an input, wherein the photographic device includes an image sensor for photographing the design and outputting a photographic signal, a data array former for sampling the photographic signal and forming a data array, and a photographic pixel data array former for re-sampling the data array and forming the photographic pixel data array, wherein the data array formed by the data array former is constituted by a plurality of pixel data, wherein the photographic pixel data array formed by the photographic pixel data array former is constituted by a plurality of photographic pixel data; and wherein the photographic pixel data array former sequentially extracts a predetermined number of pixel data of pixels adjacent to each other in an image represented by the photographic signal from the plurality of pixel data constituting the data array while the extracted pixel data are changed sequentially, and produces a single photographic pixel data based upon the extract predetermined number of pixel data every time the extractor extracts the predetermined number of pixel data is extracted.

15. An entertainment apparatus as set forth in claim 14 wherein the first and second structures constitute walls of a card insertion slot.

16. An entertainment apparatus as set forth in claim 5, further comprising a reflector for diffusely reflecting light from the light source and letting the light enter the surface to be photographed.

17. An entertainment apparatus as set forth in claim 5, further comprising:

a photographing part cover for covering the card photographing part, the cover having a position correction mark on a surface opposite to the photographic device; and a photographic pixel data fetching area corrector for correcting a fetching area of photographic pixel data based on the position correction mark, wherein the photographic device photographs the position correction mark under a state where no card is fixed in the card photographing part.

18. A method of identifying a card by photographing a plurality of cards on each of which a visually human-identifiable design is printed, including steps of:

(a) preparing a database including a plurality of entries individually corresponding to the plurality of cards, each of the entries including a pair of a card ID and a comparison data array;

(b) photographing the design of the card by using an image sensor and obtaining a photographic signal, wherein the card defines a footprint having a first dimension and a second dimension perpendicular to the first dimension, and a card photographing part includes an area having a dimension equal to the first dimension, a first structure opposing a first side of the area, a second structure opposing a second side of the area, the second side being opposite the first side, and step (b) is executed at a time when the first and second structures act to fix the card in contact with the area;

(c) sampling the photographic signal to form a data array;

(d) re-sampling the data array to form photographic pixel data array;

(e) searching the database for a specific comparison data array based on the photographic pixel data array to obtain the card ID pairing up with the specific comparison data array, wherein the data array formed in the step (c) is constituted by a plurality of pixel data, wherein the photographic pixel data array formed in the step (d) is constituted by a plurality of photographic pixel data, and wherein the step (d) includes (d1) sequentially extracting a predetermined number of pixel data of pixels adjacent to each other in an image represented by the photographic signal from the plurality of pixel data constituting the data array while the extracted pixel data are changed sequentially, and (d2) producing a single photographic pixel data based upon the predetermined number of pixel data extracted by the step (d) every time the step (d1) is executed, and (f) executing information processing according to the obtained card ID.

19. A card identifying method as set forth in claim 18, wherein, in the step (e); a distance between the photographic pixel data array and the comparison data array is calculated, and the card ID of the entry with the comparison data array at the shortest distance is obtained.

20. A card identifying method as set forth in claim 18, wherein in the step (c) the data array is formed by sampling the photographic signal at a first resolution, and in the step (d) the photographic pixel data array is formed by re-sampling the data array at a second resolution which is lower than the first resolution.

21. A card identifying method as set forth in claim 18 wherein the first and second structures constitute walls of a card insertion slot, and the identifying program makes the processor execute the step of photographing at a time when the card is in the card insertion slot.

22. A card identifying method as set forth in claim 20, wherein; in the step (e), a distance between the photographic pixel data array and the comparison data array is calculated, and the card ID of the entry with the comparison data array at the shortest distance is obtained.

23. A storage medium that is readable by a processor of a card identifying apparatus and stores an identifying program by which a plurality of cards on each of which is visually human-identifiable design is printed can be identified, the identifying program making the processor to execute steps of:
(a) preparing a database including a plurality of entries individually corresponding to the plurality of cards, each of the entries including a pair of a card ID and a comparison data array;
(b) photographing the design of the card by using an image sensor and obtaining a photographic signal, wherein the card defines a footprint having a first dimension and a second dimension perpendicular to the first dimension, and a card photographing part includes an area having a dimension equal to the first dimension, a first structure opposing a first side of the area, a second structure opposing a second side of the area, the second side being opposite the first side, and step (b) is executed at a time when the first and second structures act to fix the card in contact with the area;
(c) sampling the photographic signal to form a data array;
(d) re-sampling the data array to form a photographic pixel data array;
(e) searching the database for a specific comparison data array based on the photographic pixel data array to obtain the card ID pairing up with the specific comparison data array;
wherein the data array formed in the step (c) is constituted by a plurality of pixel data,
wherein the photographic pixel data array formed in the step (d) is constituted by a plurality of photographic pixel data, and
wherein the step (d) includes (d1) sequentially extracting a predetermined number of pixel data of pixels adjacent to each other in an image represented by the photographic signal from the plurality of pixel data constituting the data array while extracted pixel data are changed sequentially, and (d2) producing a single photographic pixel data based upon the predetermined number of pixel data extracted by the step (d1) every time that the step (d1) is executed, and
(f) executing information processing according to the obtained card ID.

24. A storage medium as set forth in claim 23 wherein the first and second structures constitute walls of a card insertion slot, and the identifying program makes the processor execute the step of photographing at a time when the card is in the card insertion slot.

* * * * *